(12) United States Patent
Jiang et al.

(10) Patent No.: US 12,445,831 B2
(45) Date of Patent: Oct. 14, 2025

(54) CHANNEL ARBITRATION METHOD AND APPARATUS

(71) Applicant: Huawei Technologies Co., Ltd., Shenzhen (CN)

(72) Inventors: Jian Jiang, Shanghai (CN); Bo Yu, Beijing (CN); Qiang Yu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 348 days.

(21) Appl. No.: 18/249,697

(22) PCT Filed: Aug. 27, 2021

(86) PCT No.: PCT/CN2021/115005
§ 371 (c)(1),
(2) Date: Apr. 19, 2023

(87) PCT Pub. No.: WO2022/083284
PCT Pub. Date: Apr. 28, 2022

(65) Prior Publication Data
US 2023/0396992 A1    Dec. 7, 2023

(30) Foreign Application Priority Data
Oct. 20, 2020  (CN) .......................... 202011126517.7

(51) Int. Cl.
*H04W 8/24*    (2009.01)
*H04W 8/18*    (2009.01)
*H04W 72/12*   (2023.01)

(52) U.S. Cl.
CPC ........... *H04W 8/245* (2013.01); *H04W 8/183* (2013.01); *H04W 72/12* (2013.01)

(58) Field of Classification Search
CPC ..... H04W 8/245; H04W 8/183; H04W 72/12; H04W 72/566; H04W 8/24; H04W 72/23; H04W 28/24
See application file for complete search history.

(56) References Cited

U.S. PATENT DOCUMENTS

| | | | |
|---|---|---|---|
| 2016/0050686 A1* | 2/2016 | Krishnamoorthi | .... H04W 28/04 455/418 |
| 2018/0152937 A1* | 5/2018 | Wen | ..................... H04W 12/082 |
| 2022/0053520 A1* | 2/2022 | Purkayastha | ...... H04W 72/1263 |

* cited by examiner

*Primary Examiner* — Khoa Huynh
(74) *Attorney, Agent, or Firm* — Slater Matsil, LLP

(57) ABSTRACT

Embodiments of this application disclose a channel arbitration method and an apparatus. After receiving an uplink grant for a first SIM card, a physical layer scheduler of a terminal device configures a transmission service priority of the first SIM card in a front-end arbiter as a first predicted priority, and configures PUSCH transmission information for the front-end arbiter based on the uplink grant, where if packeting for uplink scheduling is completed before an arbitration time point, the transmission service priority of the first SIM card is updated to a service priority of a MAC layer; the front-end arbiter arbitrates a transmission service of the first SIM card based on the PUSCH transmission information and the transmission service priority; and further, if the first SIM card is performing a voice service and the arbitration continuously fails, fallback to a DSDS 2.0 mode is triggered.

15 Claims, 15 Drawing Sheets

CHANNEL ARBITRATION METHOD AND APPARATUS

CROSS-REFERENCE TO RELATED APPLICATIONS

This application is a national stage of International Application No. PCT/CN2021/115005, filed on Aug. 27, 2021, which claims priority to Chinese Patent Application No. 202011126517.7, filed on Oct. 20, 2020. Both of the aforementioned applications are hereby incorporated by reference in their entireties.

TECHNICAL FIELD

This application relates to the field of communication technologies, and in particular, to a channel arbitration method and an apparatus.

BACKGROUND

Currently, some terminal devices may support two subscriber identification module (Subscriber Identification Module, SIM) cards simultaneously, and the two SIM cards may simultaneously operate in a standby mode. Further, based on a capability of supporting dual SIM service concurrency, the terminal devices can be further divided into two types: dual-SIM dual-standby single pass and dual-SIM dual-standby dual pass.

For a terminal device that supports dual-SIM dual-standby dual pass and in which two cards share one set of uplink transmit antennas, when the two cards simultaneously enter a connected state and need to transmit data, the two cards need to contend for use of the uplink transmit antennas to transmit data. To coordinate and arbitrate data transmission behavior of both cards, a front-end arbiter is provided in addition to a physical layer scheduler of both cards, and is configured to arbitrate the transmission behavior of the two cards.

In an existing arbitration process, the physical layer scheduler of each SIM card needs to first configure a transmission service priority for the front-end arbiter, and then the front-end arbiter obtains an arbitration result based on the service priority of each SIM card. Generally, the physical layer scheduler may configure a service priority before an arbitration time point. However, in some scenarios, the physical layer scheduler cannot configure the service priority timely before the arbitration time point, resulting in an incorrect arbitration result.

SUMMARY

Embodiments of this application provide a channel arbitration method and an apparatus, to avoid an error in an arbitration result when a MAC layer service priority cannot be configured timely.

According to a first aspect, an embodiment of this application provides a channel arbitration method, applied to a terminal device, where the method includes: receiving an uplink grant for a first SIM card from a network device, where the first SIM card is one of a plurality of SIM cards of the terminal device; configuring a transmission service priority of the first SIM card as a first predicted priority, where the first predicted priority is preconfigured; configuring, based on the uplink grant, transmission information of a physical uplink shared channel (Physical Uplink Shared Channel, PUSCH) of the first SIM card; and arbitrating a transmission service of the first SIM card based on the PUSCH transmission information and the transmission service priority of the first SIM card.

In this embodiment of this application, after receiving the uplink grant (UL grant) of the first SIM card, the terminal device configures the preconfigured first predicted priority for the first SIM card, and when the service priority cannot be configured timely, the predicted priority may be used for arbitration, thereby avoiding an error in an arbitration result when the MAC layer service priority cannot be configured timely.

In some possible implementations of the first aspect, the method may further include: determining a first priority of a to-be-transmitted packet, where the to-be-transmitted packet is a to-be-transmitted packet obtained through a transmission packeting operation based on the uplink grant; and updating the transmission service priority of the first SIM card to the first priority. In this implementation, when a priority can be configured timely, a case in which arbitration accuracy is relatively low because of continuous use of a predicted priority for arbitration can be avoided.

In some possible implementations of the first aspect, a process of arbitrating a transmission service of the first SIM card based on the PUSCH transmission information and the transmission service priority of the first SIM card may include: determining an arbitration time point based on a start time of PUSCH transmission and a preset arbitration advance, where the PUSCH transmission information includes the start time of the PUSCH transmission; triggering an arbitration procedure at the arbitration time point, and determining, based on the PUSCH transmission information, whether transmission of the first SIM card conflicts with transmission of the second SIM card; and when a conflict occurs, obtaining an arbitration result by comparing the transmission service priority of the first SIM card with a transmission service priority of the second SIM card.

When the transmission packeting operation is completed before the arbitration time point, the transmission service priority of the first SIM card is the first priority; or when the transmission packeting operation is completed after the arbitration time point, the transmission service priority of the first SIM card is the first predicted priority.

In some possible implementations of the first aspect, after performing the transmission packeting operation based on the uplink grant to obtain the to-be-transmitted packet, the method may further include: generating a second predicted priority based on remaining to-be-transmitted data of the first SIM card in a current buffer, where the second predicted priority is configured as the transmission service priority of the first SIM card after a next uplink grant is received.

In some possible implementations of the first aspect, the method may further include: collecting statistics about an arbitration success rate of the first SIM card; and when the arbitration success rate of the first SIM card is less than a preset threshold and the first SIM card is performing a target service, triggering fallback to a dual-SIM dual-standby 2.0 mode. Further, the target service is a voice call service or a video call service.

In this implementation, when service experience of a service, for example, the voice call service or the video call service, is relatively poor because of an arbitration contention failure, the service falls back to the dual-SIM dual-standby 2.0 mode, so that the service such as the voice call service or the video call service exclusively occupies an uplink transmit channel, thereby ensuring user experience of the service, for example, the voice call service or the video call service.

According to a second aspect, an embodiment of this application provides a terminal device, where at least two SIM cards are disposed on the terminal device. The terminal device may include a front-end arbiter and a physical layer scheduler of each SIM card.

The physical layer scheduler is configured to: receive an uplink grant for a first SIM card from a network device, configure a transmission service priority of the first SIM card in the front-end arbiter as a first predicted priority, and configure PUSCH transmission information of the first SIM card for the front-end arbiter based on the uplink grant, where the first SIM card is one of a plurality of SIM cards of the terminal device, and the first predicted priority is preconfigured.

The front-end arbiter is configured to arbitrate a transmission service of the first SIM card based on the PUSCH transmission information and the transmission service priority of the first SIM card.

In some possible implementations of the second aspect, the physical layer scheduler is further configured to: receive a first priority of a to-be-transmitted packet that is configured by a Media Access Control MAC layer; and update the transmission service priority of the first SIM card in the front-end arbiter to the first priority.

The to-be-transmitted packet is a to-be-transmitted packet obtained through a transmission packeting operation based on the uplink grant after the MAC layer receives the uplink grant reported by the physical layer scheduler.

In some possible implementations of the second aspect, the front-end arbiter is specifically configured to: determine an arbitration time point based on a start time of PUSCH transmission and a preset arbitration advance, where the PUSCH transmission information includes the start time of the PUSCH transmission; trigger an arbitration procedure at the arbitration time point, and determine, based on the PUSCH transmission information, whether transmission of the first SIM card conflicts with transmission of the second SIM card; and when a conflict occurs, obtain an arbitration result by comparing the transmission service priority of the first SIM card with a transmission service priority of the second SIM card.

When the transmission packeting operation is completed before the arbitration time point, the transmission service priority of the first SIM card is the first priority; or when the transmission packeting operation is completed after the arbitration time point, the transmission service priority of the first SIM card is the first predicted priority.]

In some possible implementations of the second aspect, the physical layer scheduler is further configured to receive a second predicted priority configured by the MAC layer, where the second predicted priority is generated by the MAC layer based on the remaining to-be-transmitted data of the first SIM card in a current buffer, and the second predicted priority is configured as the transmission service priority of the first SIM card after a next uplink grant is received.

In some possible implementations of the second aspect, the physical layer scheduler is further configured to: collect statistics about an arbitration success rate of the first SIM card; and when the arbitration success rate of the first SIM card is less than a preset threshold and the first SIM card is performing a target service, trigger fallback to a dual-SIM dual-standby 2.0 mode.

In some possible implementations of the second aspect, the target service is a voice call service or a video call service.

According to a third aspect, an embodiment of this application provides a terminal device, including a memory, a processor, and a computer program that is stored in the memory and that can be run on the processor. When executing the computer program, the processor implements the method according to any one of the first aspect or the possible implementations of the first aspect.

According to a fourth aspect, an embodiment of this application provides a computer-readable storage medium. The computer-readable storage medium stores a computer program, and when the computer program is executed by a processor, the method according to any one of the first aspect or the possible implementations of the first aspect is implemented.

According to a fifth aspect, an embodiment of this application provides a chip, including a processor. The processor is coupled to a memory, and when executing a computer program stored in the memory, the processor implements the method according to any one of the first aspect or the possible implementations of the first aspect. The chip may be a single chip or a chip module including a plurality of chips.

According to a sixth aspect, an embodiment of this application provides a computer program product. When the computer program product runs on a terminal device, the terminal device is enabled to perform the method according to any one of the first aspect or the possible implementations of the first aspect.

It can be understood that, for beneficial effects of the second aspect to the sixth aspect, reference may be made to related descriptions in the first aspect. Details are not described herein again.

DETAILED DESCRIPTION OF ILLUSTRATIVE EMBODIMENTS

Figure 1:
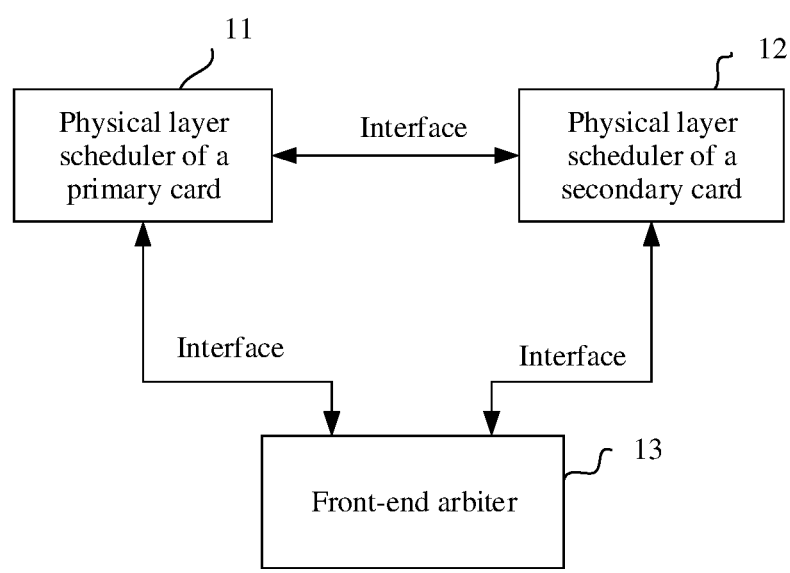
FIG. 1 is a schematic block diagram of a physical layer scheduler of a dual SIM terminal according to an embodiment of this application.

It should be understood that, when used in the specification and the appended claims of this application, the term "include" indicates presence of the described features, entireties, steps, operations, elements, and/or components, but does not exclude presence or addition of one or more other features, entireties, steps, operations, elements, components, and/or sets thereof.

It should also be understood that the term "and/or" used in the specification and the appended claims of this application refers to any combination and all possible combinations of one or more associated listed items, and includes these combinations.

As used in the specification and the appended claims of this application, according to the context, the term "if" may be interpreted as "when" or "once" or "in response to determining" or "in response to detecting". Similarly, the phrase "if it is determined that" or "if (a described condition or event) is detected" may be interpreted as a meaning of "once it is determined that" or "in response to determining" or "once (a described condition or event) is detected" or "in response to detecting (a described condition or event)" depending on the context.

In addition, in the descriptions of the specification and claims of this application, the terms "first", "second", "third", and the like are merely intended for a purpose of differentiated description, but shall not be understood as an indication or an implication of relative importance.

Reference to "an embodiment", "some embodiments", or the like described in the specification of this application indicates that one or more embodiments of this application include a specific feature, structure, or characteristic described with reference to the embodiments. Therefore, statements such as "in an embodiment", "in some embodiments", "in some other embodiments", and "in other embodiments" that appear at different places in this specification do not necessarily mean referring to a same embodiment. Instead, the statements mean "one or more but not all of embodiments", unless otherwise specifically emphasized in another manner. The terms "include", "have", and their variants all mean "include but are not limited to", unless otherwise specifically emphasized in another manner.

In addition, "a plurality of" mentioned in embodiments of this application should be explained as two or more.

Steps in the channel arbitration method provided in embodiments of this application are merely used as examples, and not all steps are mandatory, or not all content in information or messages is mandatory, and may be added or deleted as required during use. A same step or steps or messages having a same function in embodiments of this application may be mutually referenced in different embodiments.

To arbitrate transmission behavior of a SIM card, a terminal device is provided with a front-end arbiter and a physical layer scheduler. Each SIM card corresponds to a physical layer scheduler. For example, refer to a schematic block diagram of a physical layer scheduler of a dual SIM terminal shown in FIG. 1. The dual SIM terminal is provided with two SIM cards: a primary card and a secondary card. A physical layer scheduler corresponding to the primary card is a primary-card physical layer scheduler 11, and a physical layer scheduler corresponding to the secondary card is a secondary-card physical layer scheduler 12. The primary-card physical layer scheduler 11 communicates with the secondary-card physical layer scheduler 12 by using an interface. In addition, both the primary-card physical layer scheduler 11 and the secondary-card physical layer scheduler 12 communicate with the front-end arbiter 13 by using an interface.

In some embodiments, the physical layer scheduler and the front-end arbiter are software function modules. In this case, the physical layer scheduler and the front-end arbiter are integrated in the baseband processor in a form of software function modules. However, in some other embodiments, the physical layer scheduler is a software function module, and the front-end arbiter is a hardware function module. In this case, the physical layer scheduler is disposed in a baseband processor in a form of a software function module, and the front-end arbiter is a hardware function module independent of the baseband processor. Certainly, the physical layer scheduler and the front-end arbiter may be represented in any form, which is not limited herein.

The following describes a process of performing channel arbitration by using a front-end arbiter and a physical layer scheduler.

The channel arbitration process may include a service priority configuration process of the physical layer scheduler and an arbitration process of the front-end arbiter.

Service Priority Configuration Process

Figure 2:
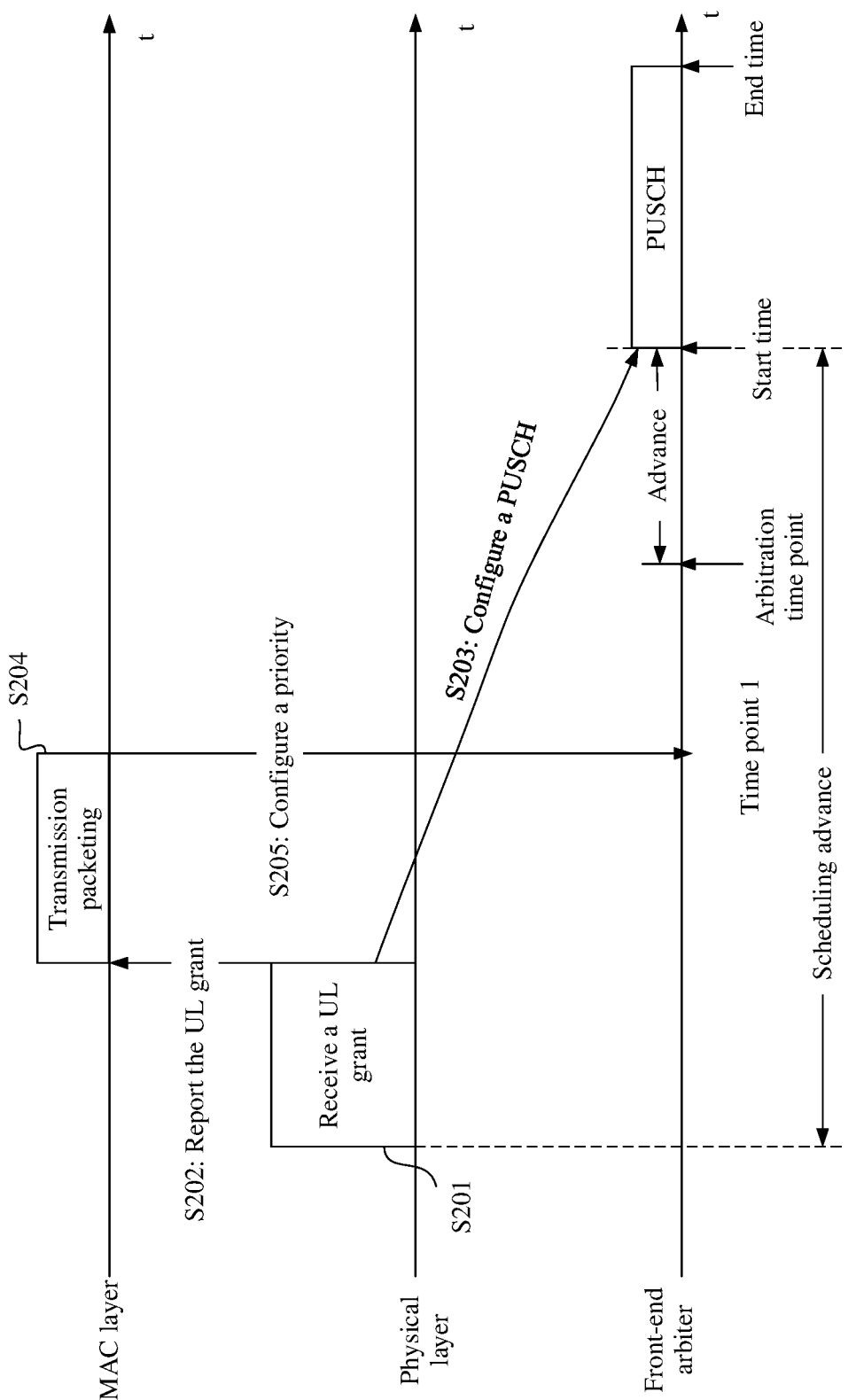
FIG. 2 is a schematic diagram of a service priority configuration process according to an embodiment of this application.

The following describes a process of configuring a service priority for a SIM card with reference to FIG. 2. FIG. 2 is a schematic diagram of a service priority configuration process according to an embodiment of this application. The process may include the following steps.

Step S201: A physical layer receives a UL grant.

Specifically, when a SIM card of a terminal device needs to transmit uplink data to a base station, the terminal device first transmits a resource assignment request to the base station, to request the base station to assign a resource used for transmitting the uplink data. After receiving, by using an antenna, the UL grant delivered by the base station, the terminal device transfers the UL grant to a physical layer scheduler in a baseband processor.

The UL grant includes an uplink resource assigned by the base station to the SIM card, for example, includes a size of a to-be-transmitted packet and PUSCH channel transmission information. The PUSCH channel transmission information may include a start time, an end time, a frequency, a bandwidth, and the like of the PUSCH channel transmission.

After receiving the UL grant, a physical layer scheduler reports the UL grant to a MAC layer, to instruct the MAC layer to perform the packet transmission packeting operation, and further configures, based on the UL grant, the PUSCH channel transmission information for a front-end arbiter.

Step S202: The physical layer reports the UL grant to the MAC layer.

Step S203: The physical layer configures the PUSCH transmission information for the front-end arbiter based on the UL grant.

Step S204: The MAC layer performs the transmission packeting operation based on the UL grant.

Specifically, to-be-transmitted data of the SIM card is buffered in a to-be-transmitted data buffer of the terminal device, and the MAC layer extracts the to-be-transmitted data from the to-be-transmitted data buffer based on a size of a to-be-transmitted packet that is specified in the UL grant, to perform data multicast, to obtain the to-be-transmitted packet of the SIM card.

After obtaining the to-be-transmitted packet, the MAC layer determines a transmission service priority of the to-be-transmitted packet based on a service type included in the to-be-transmitted packet. A corresponding priority is preset for data of each service type. For example, Table 1 shows a relationship between a service type and a correspondence.

TABLE 1

| Service type | Priority |
|---|---|
| Signaling | 1 |
| Voice data | 2 |
| Internet access service | 3 |
| Empty packet | 4 |

It can be learned from Table 1 that signaling data has the highest priority, voice data has the second highest priority, and an empty packet has the lowest priority. An empty packet means that the data packet does not include data. It can be understood that Table 1 is merely an example, and the service types, the priorities, and the like are not limited to those mentioned in Table 1.

The to-be-transmitted packet may include data of one or more service types. When the to-be-transmitted packet includes data of only one service type, a priority corresponding to the service type is used as the transmission service priority of the to-be-transmitted packet. For example, if the to-be-transmitted packet includes only signaling data, the transmission service priority of the to-be-transmitted packet is 1.

When the to-be-transmitted packet includes data of at least two service types, manners of determining the transmission service priority of the to-be-transmitted packet include but are not limited to the following two manners:

Manner 1: The highest priority of the to-be-transmitted packet is used as the transmission service priority of the to-be-transmitted packet.

For example, the to-be-transmitted packet includes data of two service types: signaling data and voice service data. In this case, if the signaling data has the highest priority in the two service types, the priority of the signaling data is used as the transmission service priority of the to-be-transmitted packet, that is, the transmission service priority of the to-be-transmitted packet is 1.

Manner 2: A sum of priorities corresponding to all service types in the to-be-transmitted packet is used as the transmission service priority of the to-be-transmitted packet.

For example, the to-be-transmitted packet includes data of two service types: signaling data and voice service data. In this case, the priority of the signaling data is 1, the priority of the voice service data is 2, and a sum of the priorities of the signaling data and the voice service data is 3. Therefore, the transmission service priority of the to-be-transmitted packet is 3.

Step S205: The MAC layer configures a service priority for the front-end arbiter by using the physical layer.

Specifically, after determining the transmission service priority of the to-be-transmitted packet, the MAC layer configures the transmission service priority for the physical layer scheduler, and the physical layer scheduler configures the transmission service priority for the front-end arbiter. In this way, the physical layer scheduler completes the transmission service priority configuration process for uplink scheduling.

It can be understood that the service priority configuration process of each SIM card is executed by the physical layer scheduler of the SIM card, and the service priority configuration process of each SIM card is the same. That is, the physical layer scheduler of each SIM card may perform the process in FIG. 2 based on the received UL grant, to complete the service priority configuration. When a plurality of SIM cards of the terminal device simultaneously contend for use of an uplink transmit antenna to transmit data, each SIM card transmits a resource assignment request to the base station. Therefore, each SIM card has a UL grant.

Arbitration Process of the Front-End Arbiter

In terms of a time sequence on a side of the front-end arbiter, after receiving PUSCH transmission information configured by a physical layer, the front-end arbiter determines an arbitration time point based on a start time in the PUSCH transmission information and a preset arbitration advance. Then, the front-end arbiter may continuously determine whether a current time point is the arbitration time point. In addition, the front-end arbiter receives, at a time point 1, a service priority that is configured by a MAC layer by using the physical layer. The time point 1 is earlier than the arbitration time point.

If the current time point is the arbitration time point, the front-end arbiter first determines whether a currently scheduled PUSCH transmission of a SIM card conflicts with PUSCH transmission of another SIM card.

Specifically, it is determined whether an overlapping part exists between a time period of the currently scheduled PUSCH transmission and a PUSCH transmission time period of the another SIM card. If there is an overlapping part, it is considered that the currently scheduled PUSCH transmission conflicts with the PUSCH transmission of the another SIM card; or if there is no overlapping part, it is considered that the currently scheduled PUSCH transmission of the current scheduling does not conflict with the PUSCH transmission of the another SIM card.

For example, a dual SIM mobile phone is provided with a primary card and a secondary card. A start time of the PUSCH channel transmission of the primary card is A, and an end time of the PUSCH channel transmission of the primary card is B. That is, the PUSCH transmission time period of the primary card is [A, B]. A start time of the PUSCH channel transmission of the secondary card is C, and an end time of the PUSCH channel transmission of the secondary card is D. That is, the PUSCH transmission time period of the secondary card is [C, D]. A<C<B<D. Because there is an overlapping part [C, B] between the PUSCH transmission time period of the primary card and the PUSCH transmission time period of the secondary card, it is determined that there is a transmission conflict between the primary card and the secondary card.

That is, if another SIM card does not transmit data in a time period of currently scheduled PUSCH transmission of a SIM card, it is considered that the SIM card does not conflict with the another SIM card. If another SIM card transmits data in a time period of currently scheduled PUSCH transmission of a SIM card, it is considered that there is a conflict between the SIM card and the another SIM card.

When the front-end arbiter determines that there is no transmission conflict, the terminal device may use a PUSCH channel to carry the to-be-transmitted packet at a start time of PUSCH transmission based on a frequency, a bandwidth, and the like of the PUSCH transmission, and transmit the to-be-transmitted packet to the base station by using an uplink transmit antenna.

When determining that there is a transmission conflict, the front-end arbiter compares transmission service priorities of the SIM cards. If the priority of the currently scheduled transmission service is higher than the transmission service priority of the conflicting SIM card, the currently scheduled PUSCH preempts a front-end uplink transmit channel to transmit data. If the priority of the currently scheduled transmission service is lower than the transmission service priority of the conflicting SIM card, the currently scheduled PUSCH transmission is not performed. If the priority of the currently scheduled transmission service is equal to the transmission service priority of the conflicting SIM card, initiation time points of the scheduling procedures are further compared, and the scheduling procedure that is initiated earlier preempts the uplink transmit channel.

Figure 3:
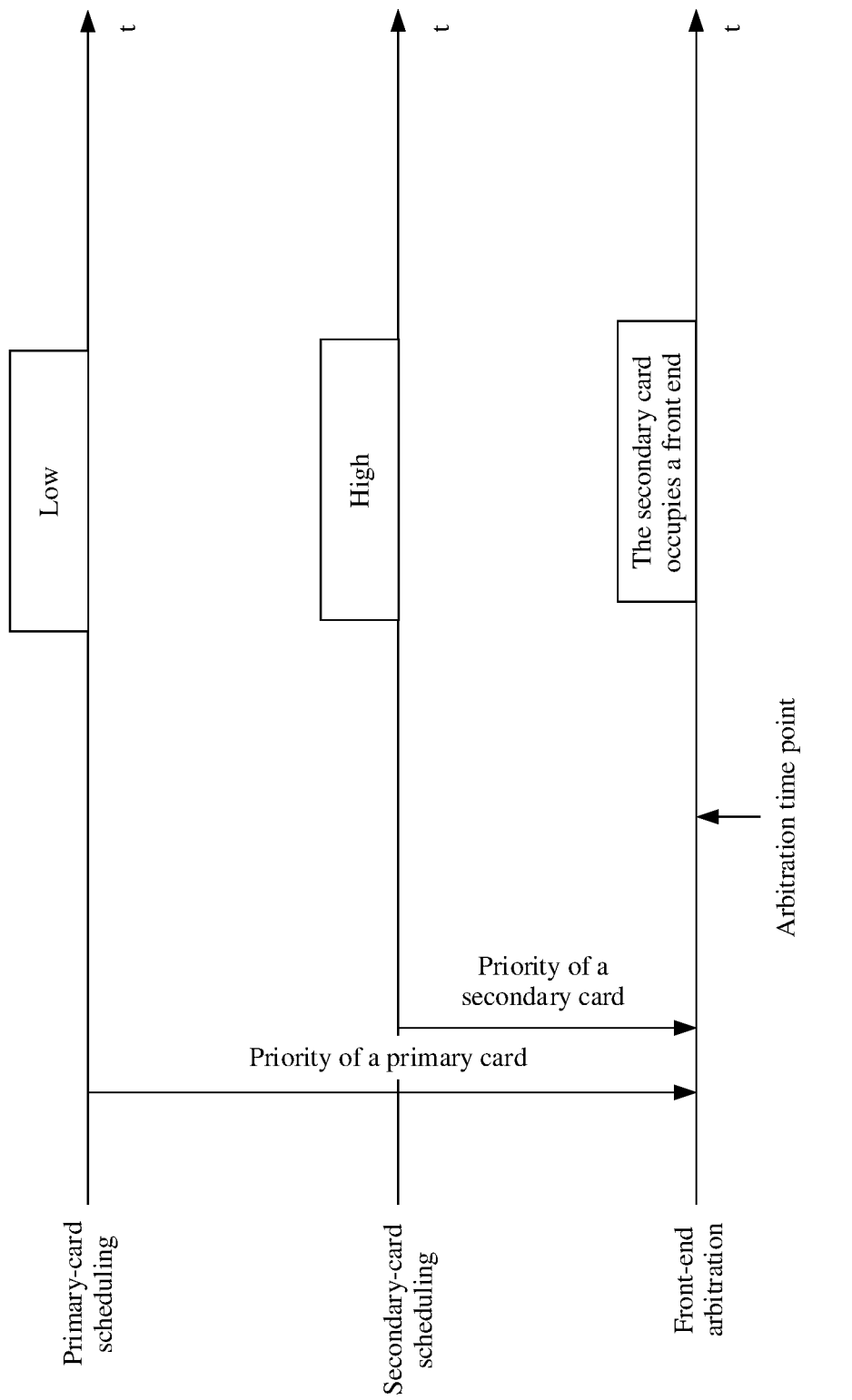
FIG. 3 is a schematic diagram of an arbitration process of primary and secondary cards of a dual SIM mobile phone according to an embodiment of this application.

For example, refer to a schematic diagram of an arbitration process of primary and secondary cards of a dual SIM mobile phone shown in FIG. 3. FIG. 3 shows a time sequence of primary-card scheduling, secondary-card scheduling, and front-end arbitration. For the primary card, a primary card priority is configured for the front-end arbitration through a primary-card scheduling time sequence procedure; and for the secondary card, a secondary card priority is configured for the front-end arbiter through a secondary-card scheduling time sequence procedure. The priority of the primary card is lower than that of the secondary card. For the primary-card scheduling time sequence procedure and the secondary-card scheduling time sequence procedure, refer to the service priority configuration procedure shown in FIG. 2. The front-end arbitration procedure is triggered at the arbitration time point. When it is determined that the primary card and the secondary card conflict, in the front-end arbitration, the priorities of the primary and secondary cards are compared. Because the priority of the secondary card is higher than that of the primary card, the secondary card preempts front-end resources and uses a front-end uplink transmit antenna to transmit data.

If the priorities of the primary card and the secondary card are the same in FIG. 3, in the front-end arbitration procedure, an initiation time of the primary-card scheduling and an initiation time of the secondary-card scheduling are further compared. It can be learned from FIG. 3 that the initiation time of the primary-card scheduling is earlier than that of the secondary-card scheduling. Therefore, the primary card uses the front-end uplink transmit antenna to transmit data.

It can be understood that the SIM card for the current scheduling may have a transmission conflict with some SIM cards in a plurality of SIM cards, and the SIM cards are conflicting SIM cards. For example, in FIG. 3, the primary card is the currently scheduled SIM card, and the secondary card is a conflicting SIM card.

In the front-end arbitration procedure, the arbitration time point is calculated based on the start time of the PUSCH channel transmission and the arbitration advance. Specifically, as shown in FIG. 2, after the physical layer configures the PUSCH transmission information to the front-end arbiter, the front-end arbiter knows the start time and the end time of the PUSCH channel transmission of the SIM card, and subtracts the arbitration advance from the start time to obtain the arbitration time point.

The arbitration time point is earlier than the start time of the PUSCH transmission, which means that the front-end arbiter needs to perform arbitration before the start time of the PUSCH transmission. Because configuration and stability of the front-end channel are involved in the uplink data transmission process, the arbitration advance needs to meet stable time for front-end configuration processing and channel switching. Generally, the arbitration advance is more than 200 microseconds (µs), and the arbitration advance is generally fixed.

In addition, as shown in FIG. 2, a scheduling advance (or referred to as a UL grant advance) is a time period between a start time at which the physical layer receives the UL grant and a start time of the PUSCH transmission. A value of the scheduling advance may be determined by the base station side. Scheduling advances of different cells may be different, and scheduling advances of different SIM cards may also be different. Generally, the scheduling advance is sufficient. That the scheduling advance is sufficient means that the time at which the MAC layer configures the priority is earlier than the arbitration time point. For example, the time point 1 in FIG. 2 is earlier than the arbitration time point.

However, in practice, there are many scenarios in which the scheduling advance is insufficient. As a result, the time point 1 at which the MAC layer configures the priority is later than the arbitration time point, that is, the MAC layer cannot configure the priority timely before the arbitration, and an error occurs in the arbitration result.

For example, in a tight time sequence scheduling scenario of New Radio (New Radio, NR), K2=0, that is, a UL grant received in a slot n needs to be transmitted in the slot n. As a result, the physical layer cannot configure a priority for the front-end arbiter before the arbitration time point.

Figure 4:
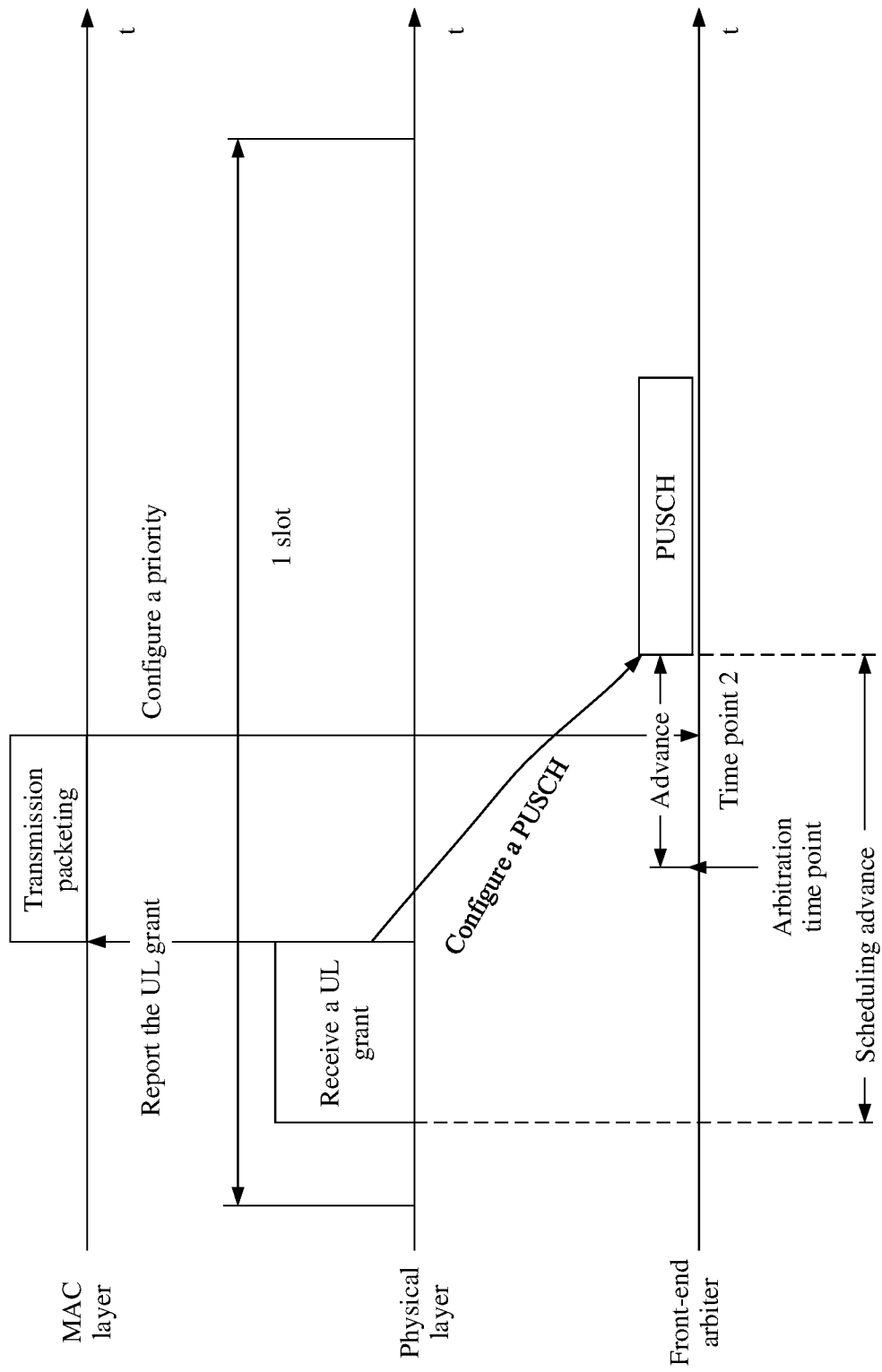
FIG. 4 is a schematic diagram of a service priority configuration process in an NR tight time sequence scheduling scenario according to an embodiment of this application.

FIG. 4 is a schematic diagram of a service priority configuration process in an NR tight time sequence scheduling scenario according to an embodiment of this application. As shown in FIG. 4, after receiving a UL grant, a physical layer reports the UL grant to a MAC layer, and configures PUSCH transmission information for a front-end arbiter based on the UL grant. The MAC layer performs a transmission packeting operation based on the UL grant, and after obtaining the to-be-transmitted packet, configures a service priority of the to-be-transmitted packet for the front-end arbiter. For similar content in FIG. 4 and FIG. 2, refer to related descriptions in FIG. 2. Details are not described herein again.

In FIG. 4, a time point 2 at which a priority is configured by the MAC layer is later than an arbitration time point. As a result, when performing arbitration, the front-end arbiter cannot know a priority of the currently scheduled PUSCH transmission priority, and considers that the priority of the currently scheduled transmission service is 0, and consequently considers that the currently scheduled transmission cannot be performed.

It can be understood that the scheduling advance is related to a start time of the PUSCH transmission. When the scheduling advance is insufficient, an arbitration time point that is determined based on the start time of the PUSCH transmission and the arbitration advance is earlier than the time point 2.

For a time sequence on the front-end arbiter side, an arbitration procedure is triggered at the arbitration time point. However, because the time point 2 is later than the arbitration time point, the service priority has not been configured before arbitration is performed. That is, when the scheduling advance is insufficient, the MAC layer cannot complete configuration of the service priority before the arbitration time point, and the front-end arbiter cannot know the priority of the currently scheduled PUSCH transmission, resulting in an error in an arbitration result.

For another example, in a large NR subcarrier spacing scenario, when an NR subcarrier spacing is 60 kHz, 120 kHz, or the like, a slot period is only 250 µs, 125 µs, or the like. As a result, the MAC layer cannot complete configuration of the service priority before the arbitration time point.

For another example, in a large uplink TA (Timing Advance, Timing Advance) scenario, receiving of uplink scheduling is aligned with a downlink time, transmission and arbitration of uplink data are aligned with an uplink time, and when the uplink TA advance is large, the MAC layer cannot complete configuration of the service priority before the arbitration time point.

That is, when the scheduling advance is insufficient, the MAC layer cannot configure the service priority before the arbitration time point, which leads to an error of the arbitration result.

In view of this problem, an embodiment of this application provides a channel arbitration solution. After receiving a UL grant, a physical layer immediately configures a predicted priority for a front-end arbiter. If the MAC layer cannot configure a service priority before an arbitration time point, a front-end arbiter uses the predicted priority for arbitration. In this case, no arbitration error will occur because no priority is configured.

Further, when configuring the predicted priority for the front-end arbiter, the MAC layer may also report the UL grant to the MAC layer, to instruct the MAC layer to perform a transmission packeting operation. After obtaining a to-be-transmitted packet, the MAC layer configures a transmission service priority of the to-be-transmitted packet for the physical layer, and then the physical layer updates the configured predicted priority with the transmission service priority.

Figure 5:
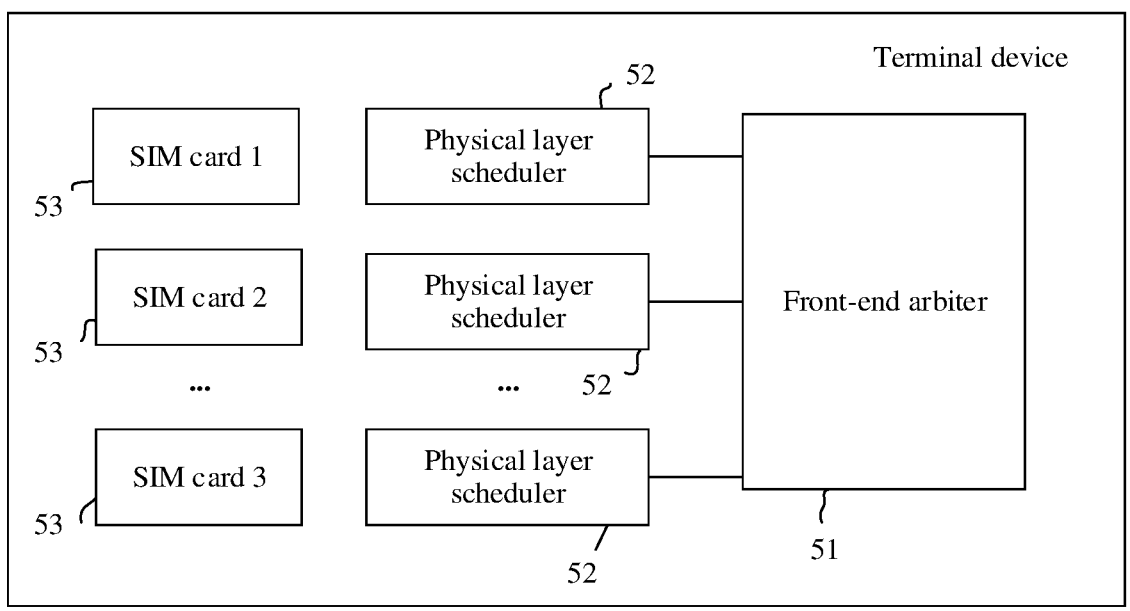
FIG. 5 is a schematic block diagram of a terminal device according to an embodiment of this application.

A channel arbitration solution provided in the embodiments of this application may be applied to a terminal device. FIG. 5 is a schematic block diagram of a terminal device according to an embodiment of this application. The terminal device may be externally presented as an arbitration apparatus including a front-end arbiter 51 and a physical layer scheduler 52 of each SIM card 53. The terminal device is provided with a plurality of SIM cards, and each SIM card corresponds to one physical layer scheduler.

Certainly, the terminal device may further include a communication interface, a storage module, and the like. The communication interface is configured to communicate with another device or a communication network by using an apparatus, for example, a transceiver. In some other embodiments, the terminal device may further be an input/output module or the like.

The physical layer scheduler is configured to perform a service priority configuration process, and the front-end arbiter is configured to perform a front-end arbitration process. The following separately describes the service priority configuration process and the front-end arbitration process in the channel arbitration process.

Service Priority Configuration Process

Figure 6:
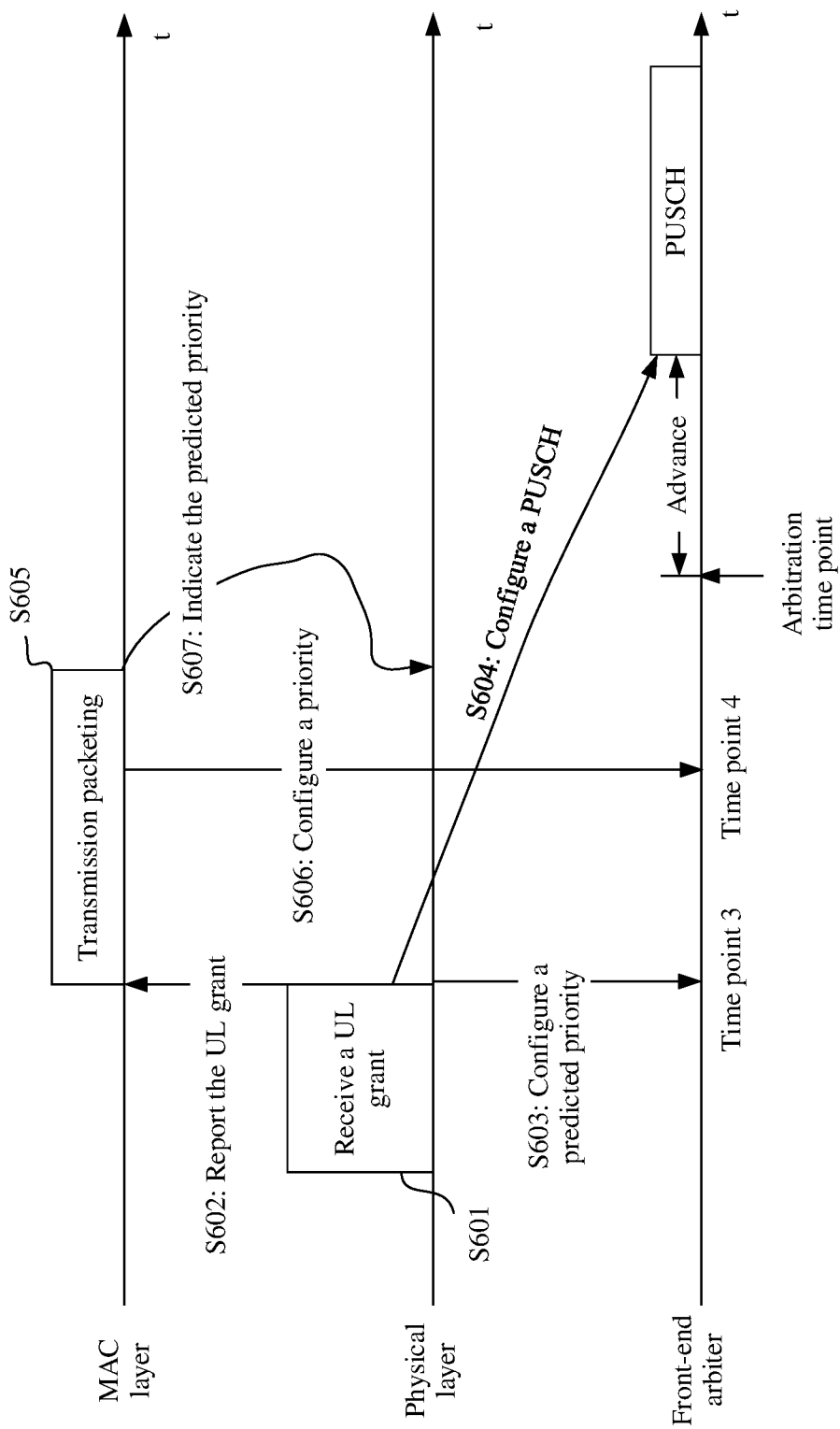
FIG. 6 is another schematic diagram of a service priority configuration process according to an embodiment of this application.

FIG. 6 is another schematic diagram of a service priority configuration process according to an embodiment of this application. The process may include the following steps.

Step S601: A physical layer receives a UL grant.

Step S602: The physical layer reports the UL grant to the MAC layer.

Step S603: The physical layer configures a predicted priority for a front-end arbiter.

Specifically, after receiving the UL grant, a physical layer scheduler may immediately configure a predicted priority for the front-end arbiter. The predicted priority is configured in a previous scheduling process. Specifically, in the previous uplink scheduling process, after obtaining the to-be-transmitted packet, the MAC layer obtains a predicted priority based on a priority of the remaining to-be-transmitted data in a current buffer, and configures the predicted priority for the physical layer scheduler.

Step S604: The physical layer configures PUSCH transmission information for the front-end arbiter based on the UL grant.

Step S605: The MAC layer performs a transmission packeting operation based on the UL grant.

Step S606: The MAC layer configures the transmission service priority of the to-be-transmitted packet for the front-end arbiter by using the physical layer.

It should be noted that the physical layer may use the transmission service priority to update the predicted priority configured at a time point 3, that is, the priority at a time point 4 overrides the predicted priority configured at the time point 3. Therefore, for the front-end arbiter, the transmission service priority before the time point 4 is the predicted priority, and the transmission service priority after the time point 4 is an actual priority obtained based on the to-be-transmitted packet.

Optionally, before the predicted priority is updated with the actual priority, the physical layer may first determine whether the front-end arbiter has started arbitration. If the front-end arbiter has started arbitration, the physical layer may not perform step S606, that is, the predicted priority is not updated with the actual priority. If the front-end arbiter has not started arbitration, the physical layer may perform step S606 to update the predicted priority with the actual priority. The actual priority is a priority determined by the MAC layer based on a data service type included in the to-be-transmitted packet after the to-be-transmitted packet is obtained through a transmission packeting operation.

In specific application, the physical layer may determine whether a current time point reaches an arbitration time point, to determine whether the front-end arbiter has started arbitration, where the current time point refers to a time when the actual priority configured by the MAC layer is received.

Step S607: The MAC layer configures a predicted priority for the physical layer.

Specifically, after completing the transmission packeting operation, the MAC layer obtains the to-be-transmitted data in the buffer of the current to-be-transmitted data, generates a predicted priority based on the to-be-transmitted data, and configures the predicted priority for the physical layer. In this way, when the physical layer scheduler receives a next UL grant, the physical layer immediately configures the predicted priority for the front-end arbiter.

Certainly, in addition to generating the predicted priority based on the remaining to-be-transmitted data after completing the transmission packeting operation, the MAC layer may further trigger a generation process of the predicted priority when data in a transmission buffer is updated. That is, when data of a new service type in the transmission buffer is updated, it is considered that the data of the new service type needs to be transmitted. In this case, the MAC layer may generate a new predicted priority based on the updated data in the transmission buffer, and notify the physical layer scheduler of the predicted priority. In this way, when the physical layer scheduler receives a next UL grant, the physical layer immediately configures the predicted priority for the front-end arbiter.

In some embodiments, the highest priority of to-be-transmitted data may be used as a predicted priority. For example, the remaining to-be-transmitted data in the current buffer includes voice data and Internet access service data, and the voice data has the highest priority. In this case, the priority of the voice data is used as the predicted priority. The priority of the voice data is 2, and the MAC layer configures a predicted priority for the physical layer, and the priority is 2.

In some other embodiments, a sum of priorities of all service types may be used as a predicted priority. For example, the remaining to-be-transmitted data in the current buffer includes signaling data and voice data, and a sum of priorities of the signaling data and the voice data is used as a predicted priority, that is, the predicted priority is 3.

In a specific application, the priority of each service type may be mapped to one bit. For example, if a priority is 2, the priority is mapped to a number in which bit 2 is 1 and other bits are 0, that is, number "2"; and if the priority is 3, the priority is mapped to a number in which bit 3 is 1 and other bits are 0, that is, number "4", and so on. Then, the priorities of the buffered data that simultaneously exists are summed up as the predicted priority.

It can be learned by comparing FIG. 2 and FIG. 6 that step S603 and step S607 are added to FIG. 6. In this way, when the MAC layer cannot configure the service priority before the arbitration time point because of an insufficient scheduling advance, the front-end arbiter may still perform arbitration by using the predicted priority, that is, perform arbitration by using the predicted priority configured at the time point 3, to avoid an error in an arbitration result because the priority is not configured. In addition, same parts between FIG. 6 and FIG. 2 are not described herein again.

Step S606 in FIG. 6 is optional. That is, after the predicted priority is configured, the front-end arbiter may perform arbitration by using only the predicted priority. In this case, after obtaining the to-be-transmitted packet, the MAC layer does not need to determine an actual priority based on the to-be-transmitted packet, and does not need to configure the actual priority for the front-end arbiter.

In this case, the front-end arbiter performs arbitration by using the predicted priority determined in the previous scheduling process. However, in a current scheduling process, the buffer adds some to-be-transmitted data. This may cause a case in which a predicted priority is inconsistent with an actual priority, and consequently, arbitration accuracy is reduced.

To avoid an arbitration accuracy problem that is caused by persistent use of the predicted priority for arbitration, after obtaining the to-be-transmitted packet, the MAC layer determines a transmission service priority of the to-be-transmitted packet, and updates the predicted priority with the transmission service priority. In this way, when the MAC layer cannot configure the service priority timely, the front-end arbiter performs arbitration by using the predicted priority; and when the MAC layer can configure the service priority timely, the front-end arbiter performs arbitration by using the actual priority. This can not only resolve a problem that an error in an arbitration result occurs because a service priority cannot be configured timely, but also avoid a problem that arbitration accuracy is relatively low because of persistent use of a predicted priority for arbitration.

Front-End Arbitration Process

For a time sequence on the front-end arbiter side, the front-end arbiter receives a configured predicted priority at a time point 3. After PUSCH transmission information configured by a physical layer is received, an arbitration time point is determined based on the PUSCH transmission information and an arbitration advance. If the arbitration time point is later than a time point 4, a service transmission priority used by the front-end arbiter is an actual priority. If the arbitration time point is earlier than the time point 4, the transmission service priority used by the front-end arbiter is the predicted priority configured at the time point 3.

That is, for the foregoing NR tight time sequence scheduling scenario, large NR subcarrier spacing scenario, large uplink TA scenario, and the like, that is, for scenarios in which the scheduling advance is insufficient, the front-end arbiter performs arbitration by using the priority configured at the time point 3. In some scenarios in which the scheduling advance is sufficient, the front-end arbiter may receive the updated actual priority at the time point 4. In this case, the front-end arbiter uses the actual priority for arbitration.

Same parts between the front-end arbitration process in FIG. 6 and the front-end arbitration process in FIG. 2 are not described herein again.

The terminal device in the embodiments of this application may be presented as an apparatus including a physical layer scheduler and a front-end arbiter, and the terminal device may also be presented as an apparatus including a processor and a memory. In this case, the terminal device is a device having a wireless transmission and reception function. The terminal device may be deployed on land, including an indoor or outdoor device, a handheld device, or a vehicle-mounted device, may be deployed on a water surface (for example, on a ship), or may be deployed in air (for example, on an aircraft, a balloon, or a satellite). The terminal device may be user equipment (user equipment, UE). The UE includes a handheld device, a vehicle, a vehicle-mounted device, a wearable device, or a computing device that has a wireless communication function. For example, the UE may be a mobile phone (mobile phone), a tablet computer, or a computer having a wireless transceiver function. Alternatively, the terminal device may be a virtual reality (virtual reality, VR) terminal device, an augmented reality (augmented reality, AR) terminal device, a wireless terminal in industrial control, a wireless terminal in self driving, a wireless terminal in telemedicine, a wireless terminal in a smart grid, a wireless terminal in a smart city (smart city), a wireless terminal in a smart home (smart home), or the like. In the embodiments of this application, an apparatus configured to implement a function of the terminal device may be a terminal, or may be an apparatus capable of supporting a terminal in implementing the function, for example, a chip system. In this embodiment of this application, the chip system may include a chip, or may include a chip and another discrete device.

Figure 7:
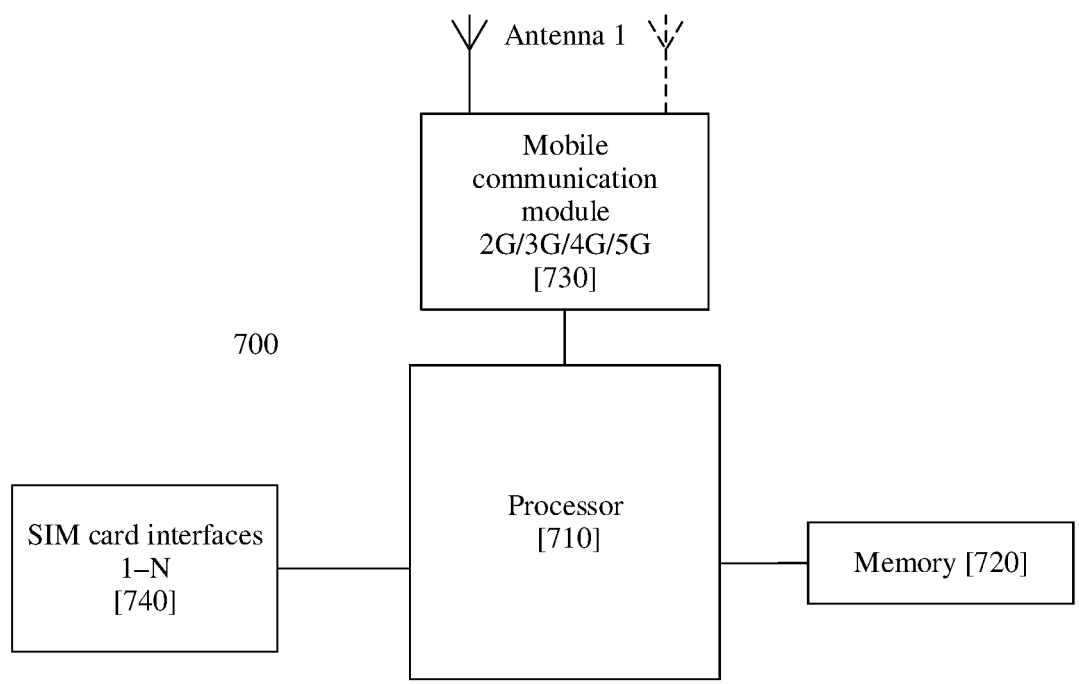
FIG. 7 is a schematic diagram of a hardware structure of a terminal device according to an embodiment of this application.

For example, FIG. 7 is a schematic diagram of a hardware structure of a terminal device according to an embodiment of this application. The terminal device 700 may include a processor 710, a memory 720, an antenna 1, a mobile communication module 730, a subscriber identification module (subscriber identification module, SIM) card interface 740, and the like.

It can be understood that the structure shown in this embodiment of this application does not constitute a specific limitation on the terminal device 700. In some other embodiments of this application, the terminal device 700 may include more or fewer components than those shown in the figure, or some components may be combined, or some components may be split, or a different component arrangement may be used. The components shown in the figure may be implemented by hardware, software, or a combination of software and hardware.

The processor 710 may include one or more processing units. For example, the processor 710 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural-network processing unit (neural-network processing unit, NPU). Different processing units may be independent devices, or may be integrated into one or more processors.

The controller may be a nerve center and a command center of the terminal device 700. The controller may generate an operation control signal based on an instruction operation code and a time sequence signal, to complete control of instruction reading and instruction execution.

The memory 720 may be a read-only memory (read-only memory, ROM), another type of static storage device that can store static information and instructions, a random access memory (random access memory, RAM), another type of dynamic storage device that can store information and instructions, an electrically erasable programmable read-only memory (electrically erasable programmable read-only memory, EEPROM), a compact disc read-only memory (compact disc read-only memory, CD-ROM), another compact disc storage, an optical disc storage (including a compact disc, a laser disc, an optical disc, a digital versatile disc, a Blu-ray disc, or the like), a magnetic disk storage medium, another magnetic storage device, or any other medium that can carry or store expected program code in a form of an instruction or a data structure and that can be accessed by a computer. However, the memory 720 is not limited thereto. The memory may exist independently, or may be integrated into the processor. The memory provided in embodiments of this application may be usually non-volatile. The memory 720 is configured to store a computer executable instruction for performing the solutions of this application, and the processor 710 controls the execution. The processor 710 is configured to execute the computer executable instruction stored in the memory 720, to implement the method provided in the embodiments of this application.

Optionally, the computer-executable instructions in this embodiment of this application may also be referred to as application program code. This is not specifically limited in this embodiment of this application.

A wireless communication function of the terminal device 700 may be implemented by the antenna 1, the mobile communication module 730, the modem processor, the baseband processor, and the like.

For example, the terminal device 700 is a mobile phone. The mobile phone receives, by using the mobile communication module 730, the antenna 1, the modem processor, and the baseband processor, a UL grant delivered by a base station, uses a PUSCH channel to carry a to-be-transmitted packet, and transmits uplink data to the base station.

The antenna 1 is configured to transmit and receive an electromagnetic wave signal. The mobile communication module 730 may provide a wireless communication solution that is applied to the terminal device 700, including 2G/3G/4G/5G and the like. The mobile communication module 730 may include at least one filter, a switch, a power amplifier, a low noise amplifier (low noise amplifier, LNA), and the like. The mobile communication module 730 may receive an electromagnetic wave by using the antenna 1, perform processing such as filtering or amplification on the received electromagnetic wave, and transfer the electromagnetic wave to the modem processor for demodulation. The mobile communication module 730 may further amplify a signal modulated by the modem processor, and convert the signal into an electromagnetic wave for radiation through the antenna 1. In some embodiments, at least some function modules of the mobile communication module 730 may be disposed in the processor 710. In some embodiments, at least some function modules of the mobile communication module 730 and at least some modules of the processor 710 may be disposed in a same device.

The modem processor may include a modulator and a demodulator. The modulator is configured to modulate a to-be-transmitted low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal by using an audio device (which is not limited to the speaker, the receiver, or the like), or displays an image or a video by using the display. In some embodiments, the modem processor may be an independent device. In some other embodiments, the modem processor may be independent of the processor 710, and is disposed in a same device as the mobile communication module 730 or another function module.

In some embodiments, the antenna 1 of the terminal device 700 is coupled to the mobile communication module 730, so that the terminal device 700 may communicate with a network and another device by using a wireless communication technology. The wireless communication technology may include a global system for mobile communications (global system for mobile communications, GSM), a general packet radio service (general packet radio service, GPRS), code division multiple access (code division multiple access, CDMA), wideband code division multiple access (wideband code division multiple access, WCDMA), time-division code division multiple access (time-division code division multiple access, TD-SCDMA), long term evolution (long term evolution, LTE), BT, a GNSS, a WLAN, NFC, FM, an IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite based augmentation system (satellite based augmentation systems, SBAS).

The SIM card interface 740 is configured to connect to a SIM card. The SIM card may be inserted into the SIM card interface 740 or removed from the SIM card interface 740 to implement contact and separation from the terminal device 700. The terminal device 700 can support one or N SIM card interfaces, where N is a positive integer greater than 1. The SIM card interface 740 may support a nano-SIM card, a micro-SIM card, a SIM card, and the like. A plurality of cards may be simultaneously inserted into a same SIM card interface 740. The plurality of cards may be of a same type or different types. The SIM card interface 740 may also be compatible with different types of SIM cards. The SIM card interface 740 may also be compatible with an external storage card. The terminal device 700 interacts with a network by using the SIM card, to implement functions such as making a call and data communication. In some embodiments, the terminal device 700 uses an eSIM, that is, an embedded SIM card. The eSIM card can be embedded in the terminal device 700 and cannot be separated from the terminal device 700.

The following describes the channel arbitration solution provided in the embodiments of this application by using the terminal device 700 as an execution body.

Figure 8:
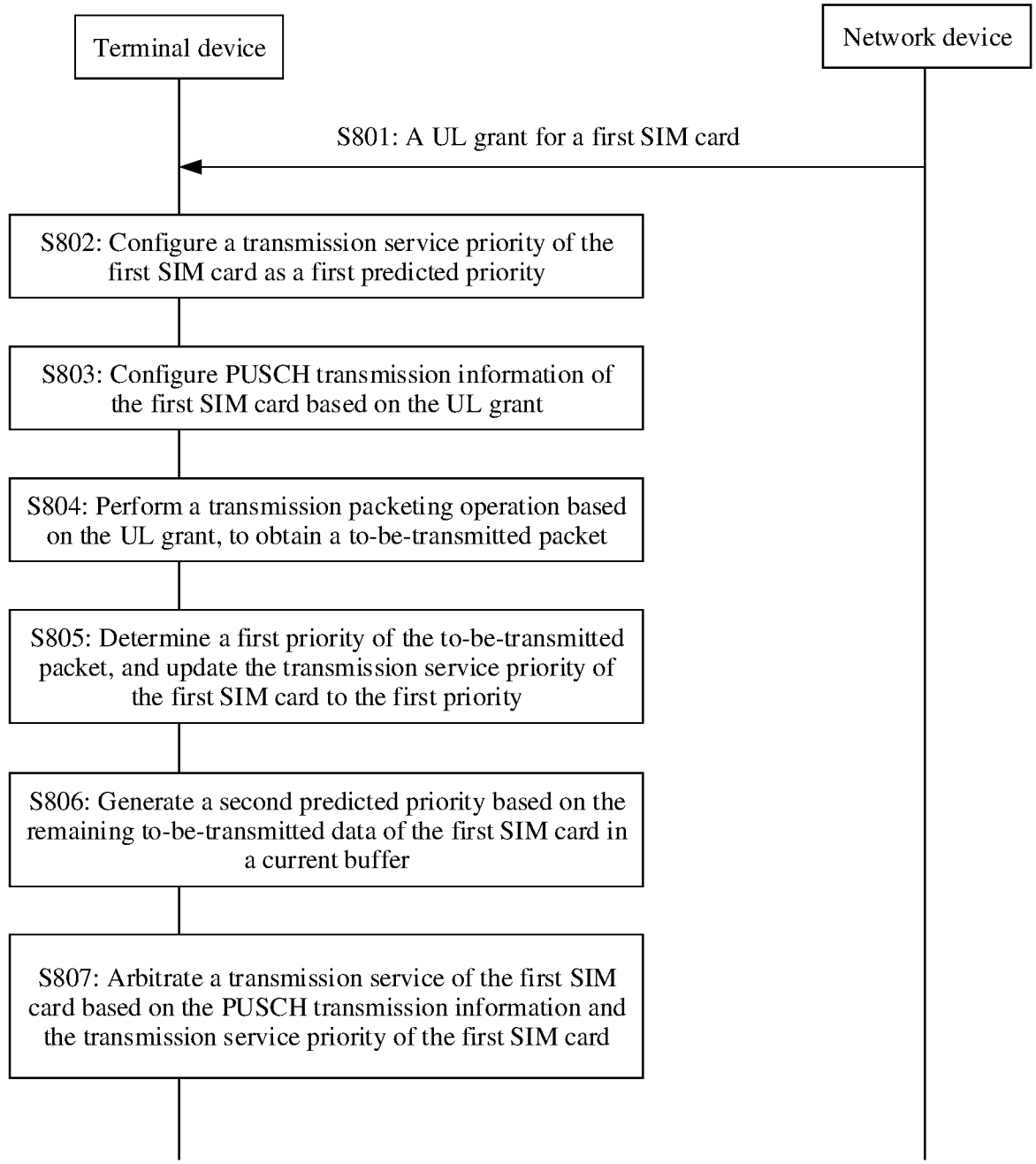
FIG. 8 is a schematic flowchart of a channel arbitration method according to an embodiment of this application.

FIG. 8 is a schematic flowchart of a channel arbitration solution according to an embodiment of this application. The method is applied to a terminal device 700, and at least two SIM cards are disposed in the terminal device 700. The channel arbitration process may include the following steps:

Step S801: A terminal device receives a UL grant for a first SIM card that is delivered by a network device.

Specifically, the terminal device 700 receives, by using an antenna 1, the UL grant delivered by the network device, and transfers the UL grant to the processor 710. The network device may be a base station device.

The terminal device 700 has a plurality of SIM card interfaces 740, and is provided with a plurality of SIM cards. The first SIM card is any one of the plurality of SIM cards.

Step S802: The terminal device configures a transmission service priority of the first SIM card as a first predicted priority.

The first predicted priority is configured on the first SIM card in a previous scheduling process, and the first predicted priority may be the same as the predicted priority configured in step S503 in FIG. 5.

Certainly, the first predicted priority may alternatively not be configured based on a priority of the remaining to-be-transmitted data in the previous scheduling process, and the first predicted priority may be configured in any manner.

Step S803: The terminal device configures PUSCH transmission information of the first SIM card based on the UL grant.

Step S804: The terminal device performs a transmission packeting operation based on the UL grant, to obtain a to-be-transmitted packet.

Optionally, the process may further include step S805: The terminal device determines a first priority of the to-be-transmitted packet, and updates the transmission service priority of the first SIM card to the first priority.

Specifically, the first priority of the to-be-transmitted packet is obtained based on a service type included in the to-be-transmitted packet. After the first priority is obtained, the first priority is used to override the first predicted priority. After the update, the transmission service priority of the first SIM card changes to the first priority. For a specific process, refer to related content of step S506 in FIG. 5. Details are not described herein again.

Optionally, the process may further include step S806: The terminal device generates a second predicted priority based on remaining to-be-transmitted data of the first SIM card in a current buffer. For specific description, refer to related content of step S507 in FIG. 5. Details are not described herein again.

Step S807: The terminal device arbitrates a transmission service of the first SIM card based on the PUSCH transmission information and the transmission service priority of the first SIM card.

Specifically, the terminal device determines an arbitration time point based on a start time of the PUSCH transmission and a preset arbitration advance, and continuously determines whether a current time point is the arbitration time point. If the current time point is the arbitration time point, it is first determined whether transmission of the first SIM card conflicts with transmission of the second SIM card. If the transmission of the first SIM card conflicts with the transmission of the second SIM card, the transmission service priority of the first SIM card is compared with a transmission service priority of the second SIM card, to obtain an arbitration result.

It should be noted that, if step S805 is further included, when the transmission packeting operation is completed before the arbitration time point, that is, the MAC layer can configure the service priority timely, the transmission service priority of the first SIM card is the first priority; or when the transmission packeting operation is completed after the arbitration time point, that is, the MAC layer cannot configure the service priority timely, the transmission service priority of the first SIM card is the first predicted priority.

If step S805 is not included, that is, the priority of the to-be-transmitted packet is not determined, and the priority of the to-be-transmitted packet is used to update the configured predicted priority, in this case, regardless of whether the transmission packeting operation is completed before or after the arbitration time point, the predicted priority configured in step S802 is used for arbitration.

It can be understood that FIG. 8 is described by using a terminal device as an execution body, and FIG. 5 is described by using a physical layer scheduler and a front-end arbiter in a terminal device as execution bodies. Mutual reference may be made between FIG. 8 and FIG. 5.

The terminal device 700 arbitrates transmission services of a plurality of SIM cards by using the channel arbitration solution provided in the embodiments of this application, so that a SIM card with a high transmission service priority preempts an uplink transmit channel to transmit data, and a SIM card with a low transmission service priority fails to transmit data.

In some service scenarios, if uplink data transmission of a SIM card continuously fails in arbitration contention, user experience is poor. For example, for a service such as a voice call service or a video call service, if contention always fails, uplink voice service data cannot be transmitted, and consequently, experience of the service, for example, the voice service or the video call service, is relatively poor. For this problem, no countermeasures are provided in the conventional technology.

However, in this embodiment of this application, to improve experience of a service, for example, a voice call service or a video call service, the terminal device 700 may collect statistics about an arbitration success rate of each SIM card, return to a specified mode when the arbitration success rate is lower than a threshold.

For example, the terminal device 700 is a dual SIM terminal that is provided with a primary card and a secondary card. The primary card is performing a first service, and the secondary card is performing a second service. That is, the primary card and the secondary card need to contend for use of an uplink transmit antenna to transmit data. In this case, the terminal device 700 performs channel arbitration on the transmission services of the primary card and the secondary card.

A physical layer scheduler of the primary card collects statistics about the arbitration success rate of the primary card, and a physical layer scheduler of the secondary card collects statistics about the arbitration success rate of the secondary card.

For a SIM card, if the arbitration success rate is lower than the preset threshold and the ongoing service is a target service, fallback to the specified mode is triggered. For example, the target service may be a voice call service or a video call service.

For example, the first service performed by the primary card is a voice call service, and when the statistics collected by physical layer scheduler of the primary card show that the arbitration success rate of the service of the primary card is lower than the preset threshold, fallback from DSDS 3.0 or DSDS 5.0 to DSDS 2.0 is triggered.

Dual-SIM dual-standby (Dual SIM Dual Standby, DSDS) terminals may be further divided into the following types: DSDS 2.0, DSDS 3.0, and DSDS 5.0.

DSDS 2.0: Both cards can be in a standby mode at the same time, but only single pass can be implemented. When one card enters the connected state, the other card can only be in the standby mode.

DSDS 3.0: Both cards can enter the connected state at the same time, and both cards support only LTE (Long Term Evolution, Long Term Evolution).

DSDS 5.0: Both cards can enter the connected state at the same time, and both cards support LTE or NR.

After the terminal device triggers fallback to DSDS 2.0, the voice call service of the primary card exclusively occupies the uplink transmit channel, thereby ensuring user experience of the voice call service.

It should be noted that the foregoing preset threshold may be set according to an actual requirement. In addition, if the MAC layer of the card cannot configure the service priority before the arbitration time point, the preset threshold is set to P1; or if the MAC layer of the card can configure the service priority before the arbitration time point, the preset threshold is set to P2. P1 is not equal to P2.

It can be learned that statistics about the arbitration success rate of each SIM card are counted, and when a SIM card is performing a target service and the arbitration success rate is lower than the preset threshold, the terminal device may enable the SIM card that is performing the target service to exclusively occupy the uplink transmit channel, thereby ensuring user experience of the target service.

To better describe the solution provided in the embodiments of this application, the following provides description by using an example with reference to a specific scenario.

Figure 9A:
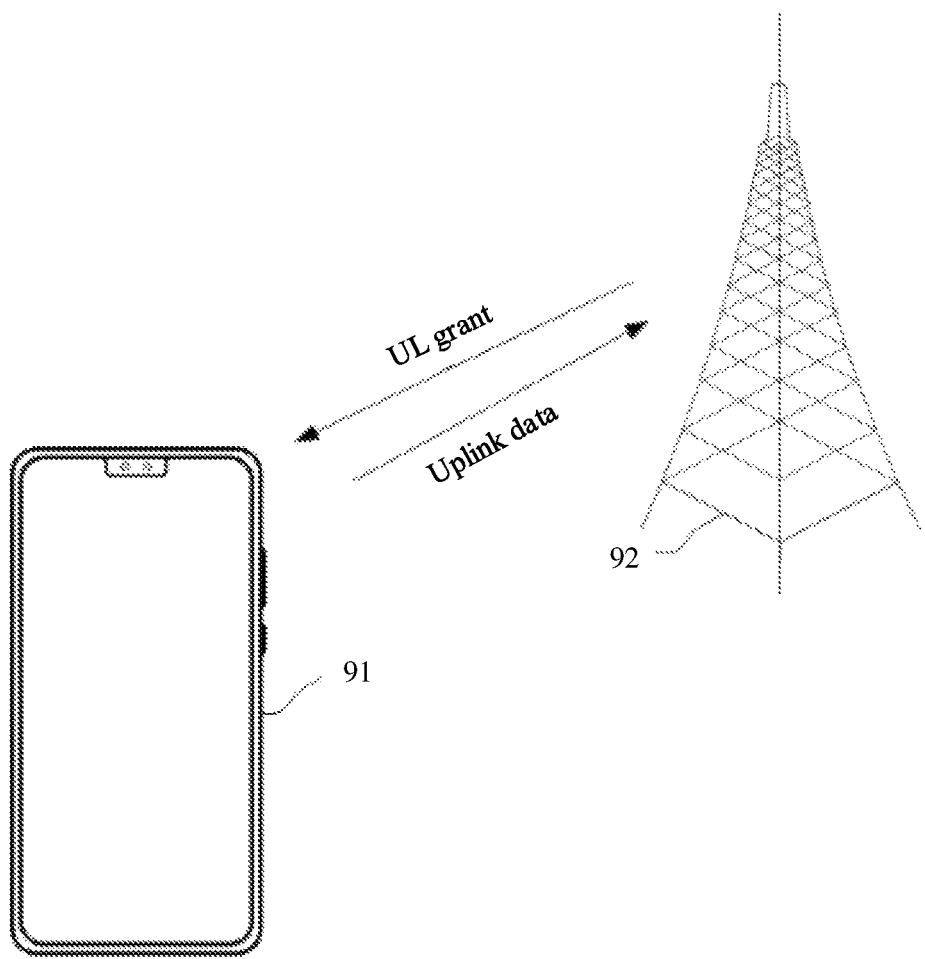
FIG. 9A to FIG. 9D are schematic diagrams of a dual SIM mobile phone scenario according to an embodiment of this application.
Figure 9B:
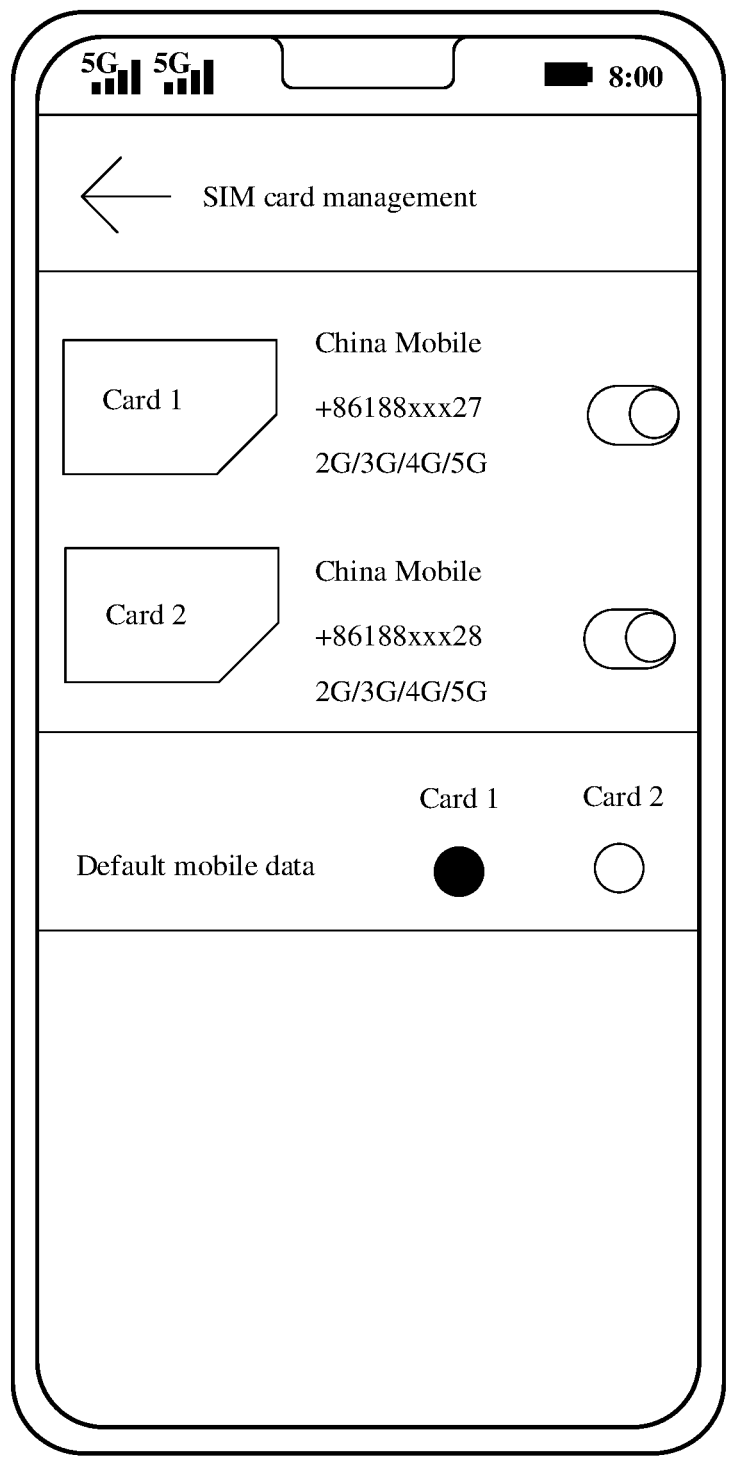

FIG. 9A to FIG. 9D are schematic diagrams of a dual SIM mobile phone scenario according to an embodiment of this application. As shown in FIG. 9A, there are a mobile phone 91 and a base station 92 in the scenario. The mobile phone 91 may receive a UL grant delivered by the base station 92, and the mobile phone 91 may transmit uplink data to the base station 92.

The mobile phone 91 is provided with two SIM cards: a card 1 and a card 2. The mobile phone 91 is currently in a DSDS 5.0 or DSDS 3.0 mode. The mobile phone 91 sets "Default mobile data" to "Card 1". For details, refer to FIG. 9B.

Figures 1, 9C:
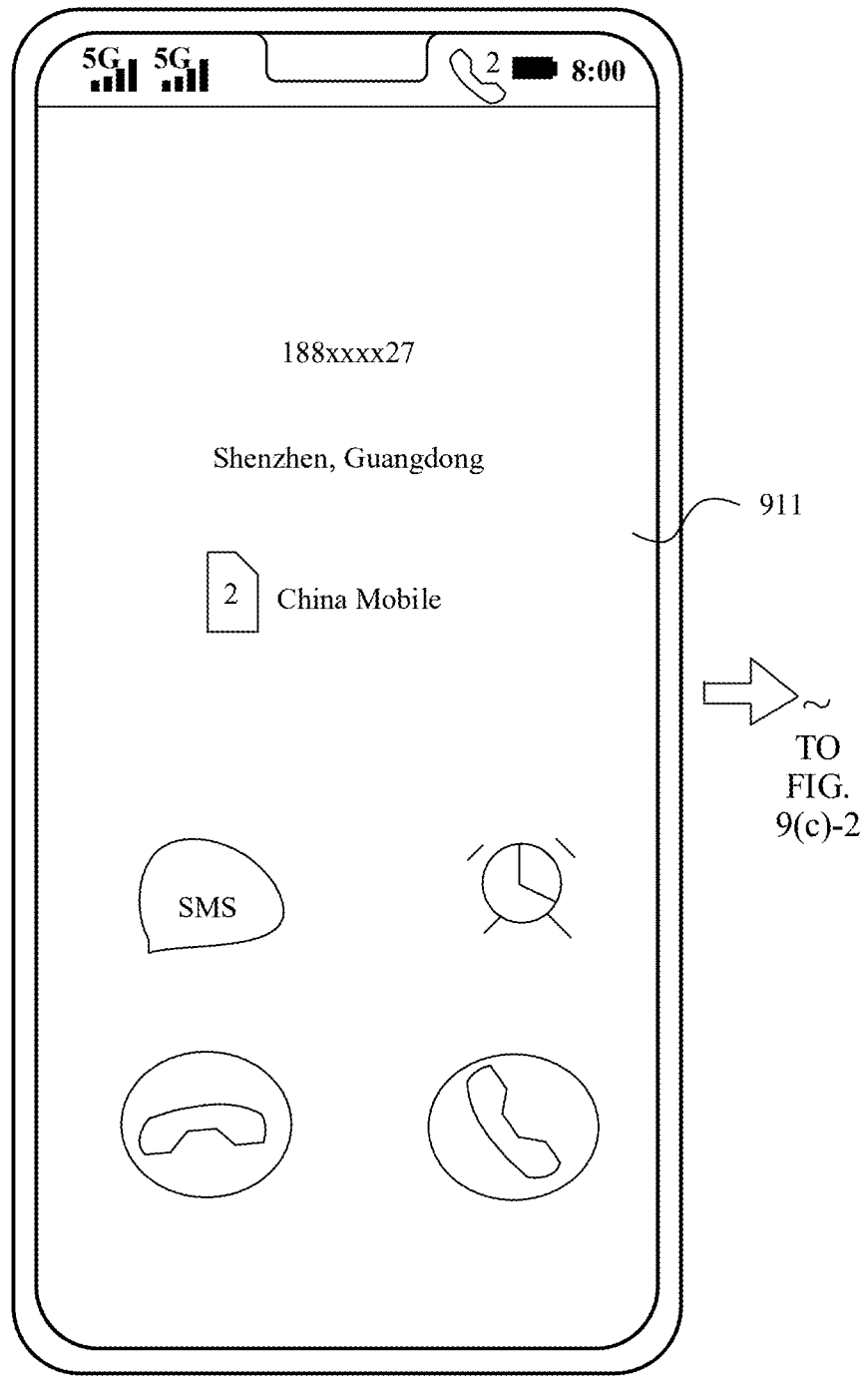
Figures 2, 9C:
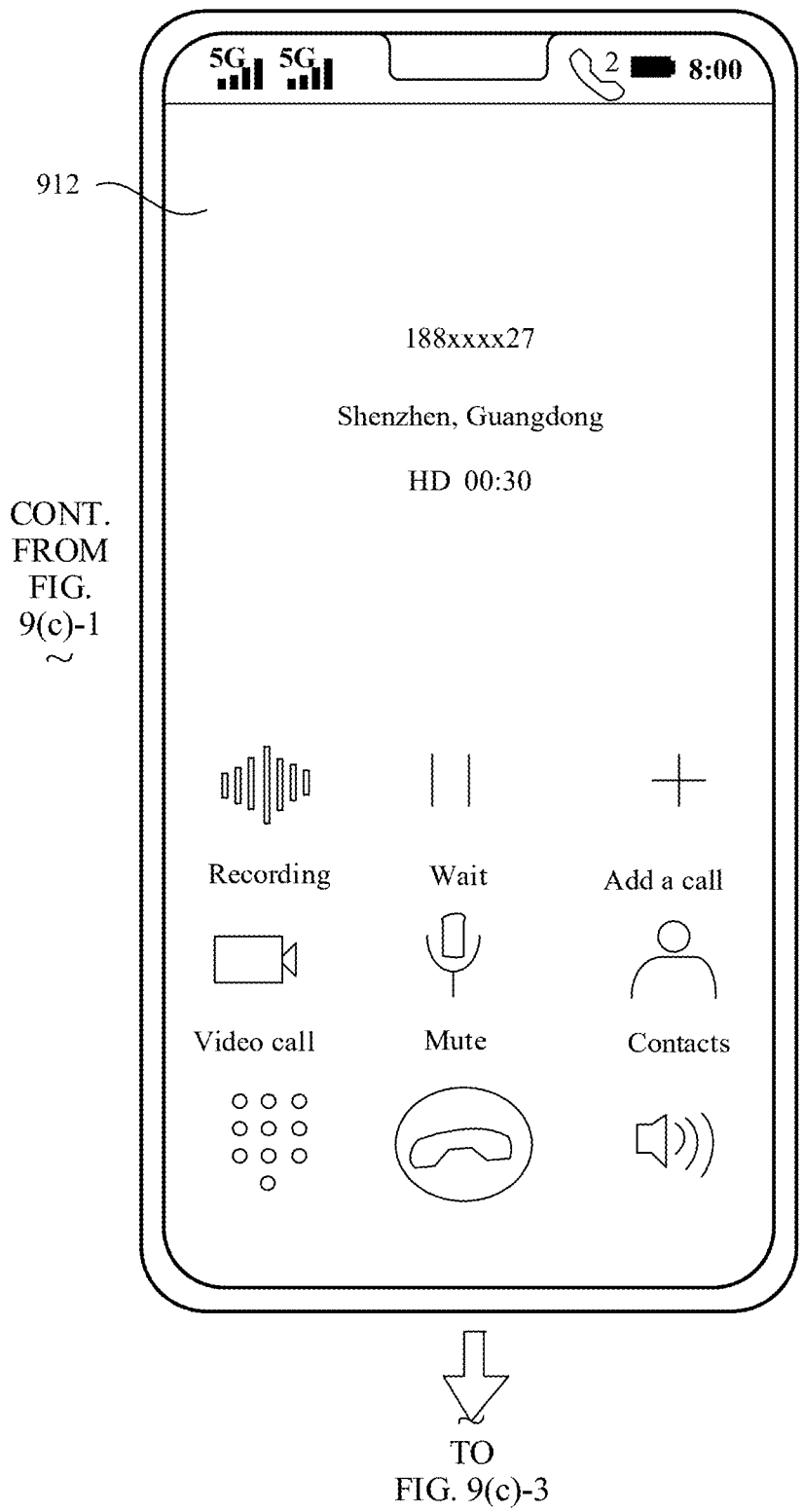
Figures 3, 9C:
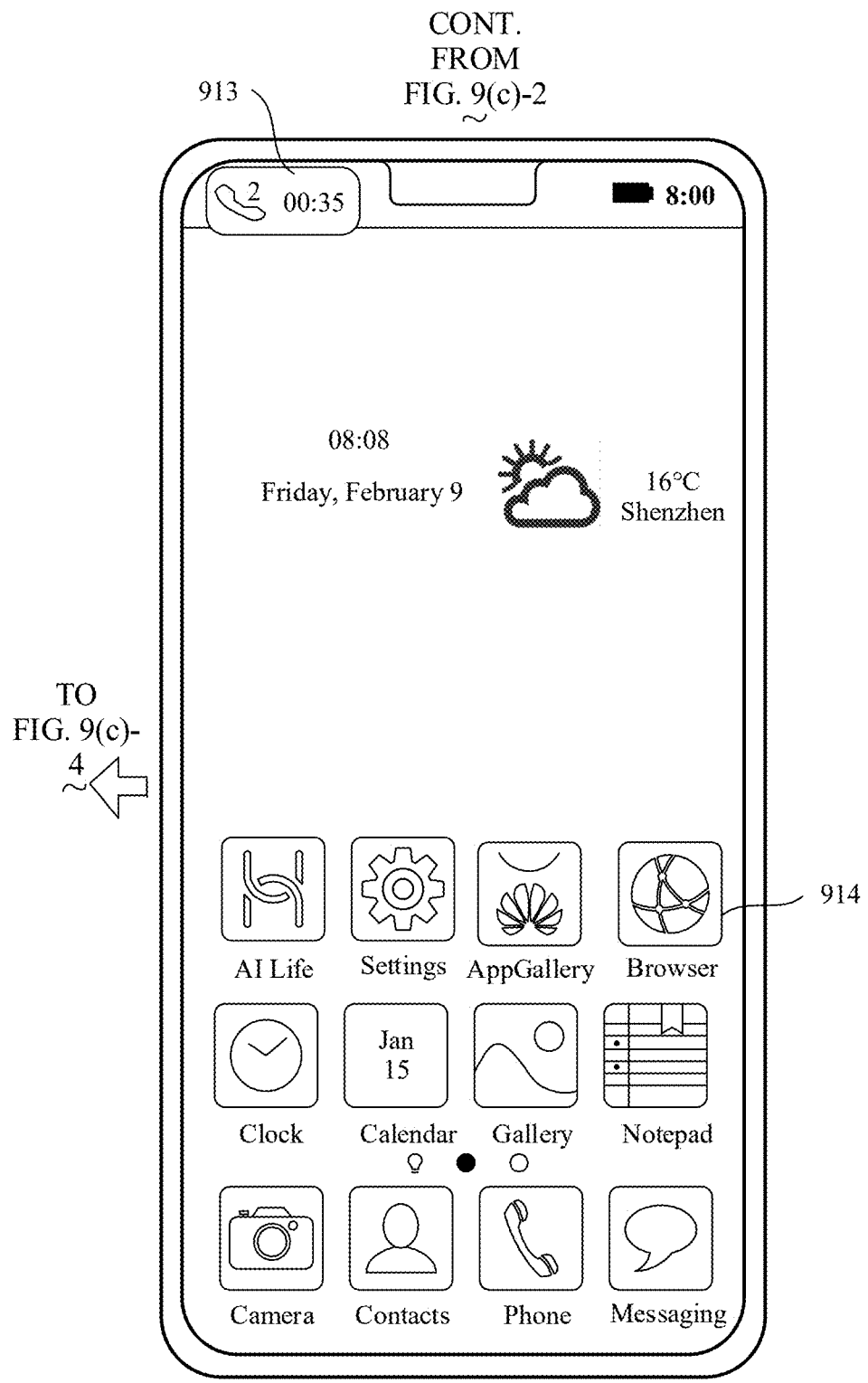
Figures 4, 9C:
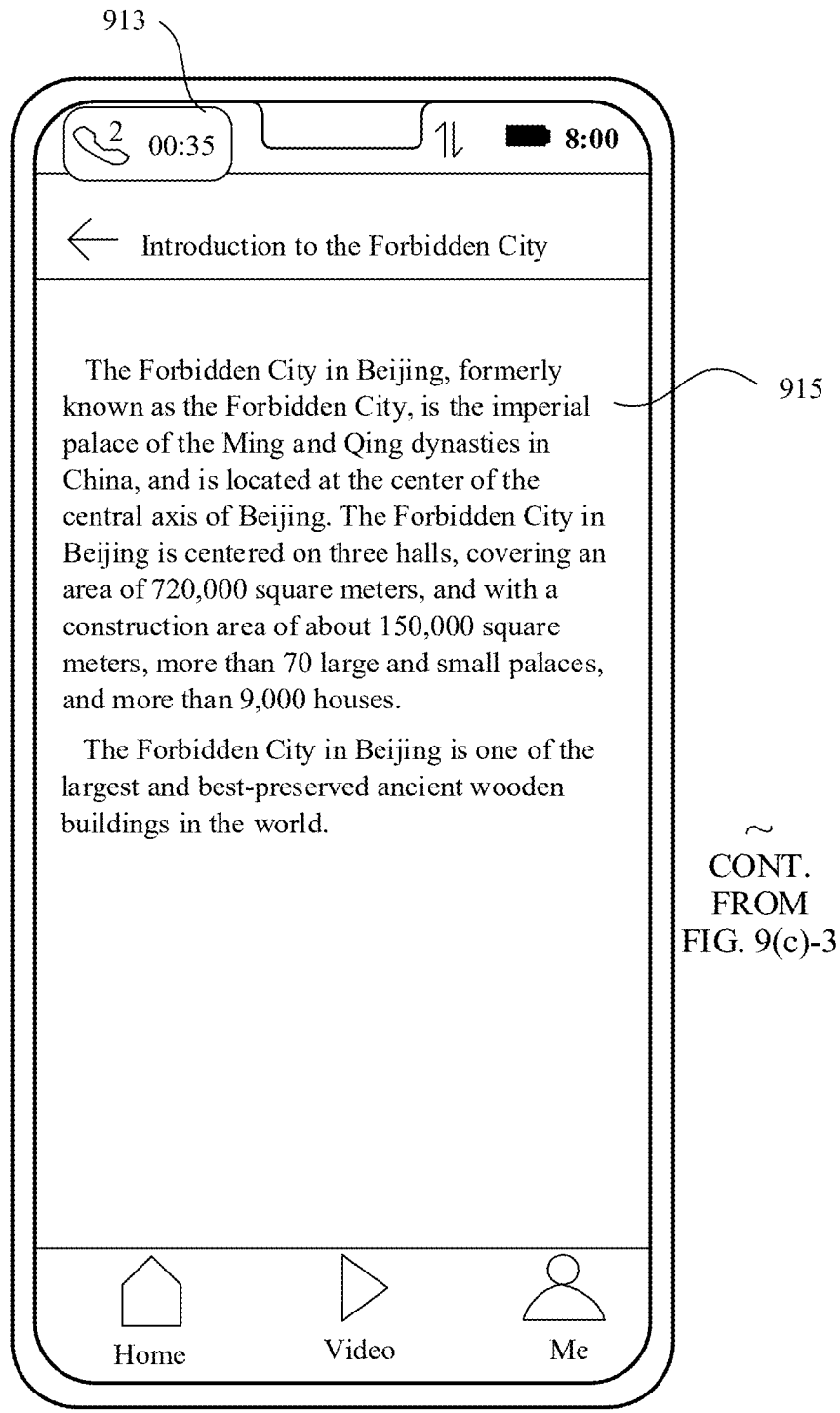
Figure 9D:
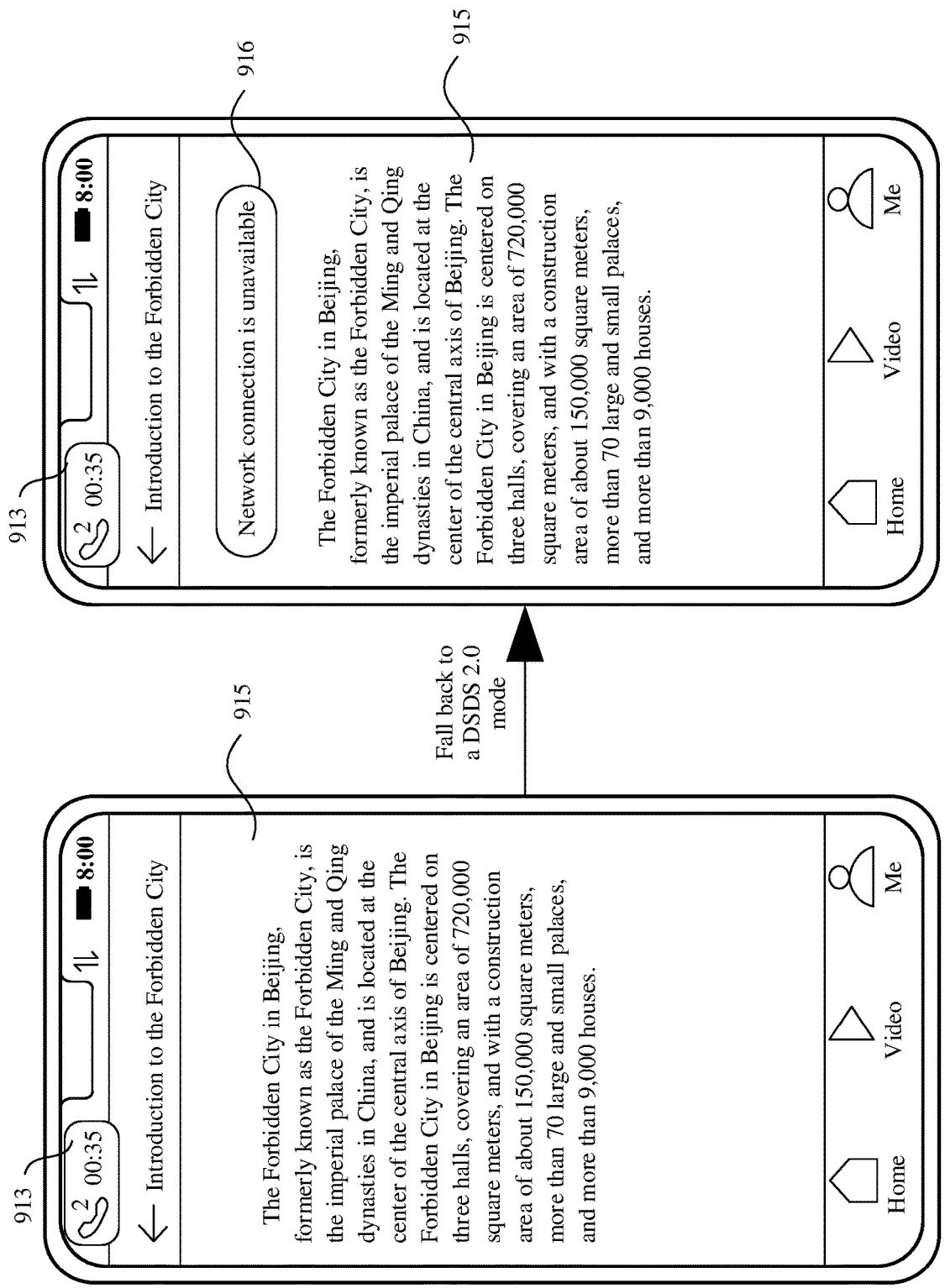

As shown in FIG. 9C-1 to FIG. 9C-4, the mobile phone 91 receives a call for the card 2, and displays an incoming call interface 911. After a user taps an accepting button on the incoming call interface 911, the mobile phone 91 displays an accepting interface 912. In this case, the user inputs a rightward sliding gesture or the like on the left side of the accepting interface of the mobile phone 91, to exit the accepting interface, and the mobile phone 91 reduces the accepting interface 912 to 913. Then, the user taps a news application 914, and the mobile phone 91 displays a web page 915.

In this scenario, the mobile phone 91 is making a call by using the card 2, and is still browsing a web page. Because "Default mobile data" to "Card 1", the mobile phone 91 is using mobile data of the card 1 to access the Internet. That is, the mobile phone 91 is using the card 1 to access the Internet and using the card 2 to make a call.

The mobile phone 91 has only one set of uplink transmit channels, and the card 1 and the card 2 need to contend for use of the uplink transmit channels to transmit uplink data. The mobile phone 91 performs channel arbitration based on transmission service priorities of the card 1 and the card 2.

At a current moment, the card 2 of the mobile phone 91 camps on a cell 1, and a voice call service of the card 1 and an Internet access service of the card 2 are normally performed. In this case, a scheduling advance of the cell 1 is sufficient. That is, for the card 2, the MAC layer can configure a service priority before an arbitration time point. For the card 1, the MAC layer can also configure a service priority before the arbitration time point.

A signal strength of the cell 1 becomes weak and that of the cell 2 becomes strong. As a result, the card 2 is handed over from the cell 1 to the cell 2. Both the cell 1 and the cell 2 are cells of the card 2. In addition, the cell 1 and the cell 2 are neighboring cells, and the scheduling advance of the cell 1 is greater than that of the cell 2.

In this case, because the scheduling advance of the cell 2 is smaller, the physical layer scheduler of the card 2 cannot configure the service priority before the arbitration time point. In this case, if the conventional technology is used, because the service priority cannot be configured before the arbitration time point, when the mobile phone 91 performs channel arbitration, the transmission service priority of the card 2 is 0, and consequently a large amount of voice data of the card 2 fails to be transmitted. On the base station side, it can be observed that power of the PUSCH channel of the card 2 is 0.

However, if the solution in the embodiments of this application is used, the mobile phone 91 preconfigures a predicted priority. Therefore, even if a service priority cannot be configured for the card 2 before the arbitration time point, a large quantity of transmission failures do not occur on the card 2. That is, the power of the PUSCH channel of the card 2 on the base station side is not 0.

In addition, for a case in which a large quantity of transmission failures occurs on the card 2, no solution is provided in the conventional technology. Therefore, the case in which a large quantity of transmission failures occurs on the card 2 will continue. However, in the embodiments of this application, the mobile phone 91 collects statistics about arbitration success rates of the card 2 and the card 1. When the mobile phone 91 determines that the arbitration success rate of the card 2 is lower than the preset threshold, and the card 2 is performing the voice call service, the mobile phone 91 triggers fallback to the DSDS 2.0 mode.

After the mobile phone 91 triggers fallback to the DSDS 2.0 mode, the card 2 exclusively occupies the uplink transmit channel, and Internet access service data of the card 1 becomes unavailable. Specifically, as shown in to FIG. 9D, a call service of the mobile phone 91 is normal, but the web page 915 displays "Network connection unavailable" 916, that is, the Internet access service of the card 1 is unavailable. That is, the Internet access of the card 1 is interrupted, and the voice data transmission of the card 2 is restored.

It should be understood that sequence numbers of the steps do not mean an execution sequence in the foregoing embodiments. The execution sequence of the processes should be determined based on functions and internal logic of the processes, and should not constitute any limitation on the implementation processes of embodiments of this application.

In addition, an embodiment of this application further provides a computer-readable storage medium. The computer-readable storage medium stores a computer program. When the computer program is executed by a processor, the steps in the foregoing method embodiments can be implemented.

An embodiment of this application provides a computer program product. When the computer program product runs on a terminal device, the terminal device is enabled to implement the steps in the foregoing method embodiments when executing the computer program product.

An embodiment of this application further provides a chip system. The chip system includes a processor, the processor is coupled to a memory, and the processor executes a computer program stored in the memory, to implement the methods in the foregoing method embodiments. The chip system may be a single chip or a chip module including a plurality of chips.

In the foregoing embodiments, the description of each embodiment has respective focuses. For a part that is not described in detail or recorded in an embodiment, refer to related descriptions in other embodiments.

A person of ordinary skill in the art may be aware that, in combination with the examples described in embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the aft may use different methods to implement the described functions for each particular application, but it should not be considered that the implementation goes beyond the scope of this application.

In embodiments provided in this application, it should be understood that the disclosed apparatus/electronic device and method may be implemented in other manners. For example, the described apparatus/electronic device embodiment is merely an example. For example, division into the modules or units is merely logical function division and may be other division in an actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated module/unit is implemented in a form of a software functional unit and sold or used as an independent product, the integrated module/unit may be stored in a computer-readable storage medium. Based on such an understanding, in this application, all or some of the procedures of the methods in the foregoing embodiments may be implemented by a computer program instructing related hardware. The computer program may be stored in a computer-readable storage medium. When the computer program is executed by a processor, the steps in the foregoing method embodiments can be implemented. The computer program includes computer program code. The computer program code may be in a source code form, an object code form, an executable file form, some intermediate forms, or the like. The computer-readable storage medium may include any entity or apparatus capable of carrying the computer program code, a recording medium, a USB flash drive, a removable hard disk, a magnetic disk, an optical disc, a computer memory, a read-only memory (ROM, Read-Only Memory), a random access memory (RAM, Random Access Memory), an electrical carrier signal, a telecommunication signal, a software distribution medium, and the like. It should be noted that content included in the computer-readable storage medium may be appropriately added or deleted based on requirements of legislation and patent practice in a jurisdiction. For example, in some jurisdictions, according to the legislation and patent practice, the computer-readable storage medium does not include an electrical carrier signal or a telecommunication signal.

In conclusion, the foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, applied to a terminal device, the method comprising:
    receiving an uplink grant for a first subscriber identification module (SIM) card from a network device, wherein the first SIM card is comprised in a plurality of SIM cards of the terminal device;
    configuring a transmission service priority of the first SIM card as a first predicted priority, wherein the first predicted priority is preconfigured;
    configuring, based on the uplink grant, physical uplink shared channel (PUSCH) transmission information of the first SIM card; and
    arbitrating a transmission service of the first SIM card based on the PUSCH transmission information and the transmission service priority of the first SIM card.

2. The method according to claim 1, further comprising:
    determining a first priority of a to-be-transmitted packet, wherein the to-be-transmitted packet is obtained through a transmission packeting operation based on the uplink grant; and
    updating the transmission service priority of the first SIM card to the first priority.

3. The method according to claim 2, wherein arbitrating the transmission service of the first SIM card based on the PUSCH transmission information and the transmission service priority of the first SIM card comprises:
    determining an arbitration time point based on a start time of a PUSCH transmission and a preset arbitration advance, wherein the PUSCH transmission information comprises the start time of the PUSCH transmission;
    triggering an arbitration procedure at the arbitration time point, and determining, based on the PUSCH transmission information, whether transmission of the first SIM card conflicts with transmission of a second SIM card of the plurality of SIM cards of the terminal device; and
    when a conflict occurs, obtaining an arbitration result by comparing the transmission service priority of the first SIM card with a transmission service priority of the second SIM card, wherein:
    when the transmission packeting operation is completed before the arbitration time point, the transmission service priority of the first SIM card is the first priority; or
    when the transmission packeting operation is completed after the arbitration time point, the transmission service priority of the first SIM card is the first predicted priority.

4. The method according to claim 2, wherein after performing the transmission packeting operation based on the uplink grant to obtain the to-be-transmitted packet, the method further comprises:
generating a second predicted priority based on remaining to-be-transmitted data of the first SIM card in a buffer, wherein the second predicted priority is configured as the transmission service priority of the first SIM card after a next uplink grant is received.

5. The method according to claim 1, further comprising:
collecting statistics about an arbitration success rate of the first SIM card; and
when the arbitration success rate of the first SIM card is less than a preset threshold and the first SIM card is performing a target service, triggering fallback to a dual-SIM dual-standby 2.0 mode.

6. A terminal device, comprising:
a front-end arbiter; and
a physical layer scheduler of each subscriber identification module (SIM) card of a plurality of SIM cards of the terminal device;
wherein the physical layer scheduler is configured to:
receive an uplink grant for a first SIM card of the plurality of SIM cards of the terminal device from a network device;
configure a transmission service priority of the first SIM card in the front-end arbiter as a first predicted priority; and
configure physical uplink shared channel (PUSCH) transmission information of the first SIM card for the front-end arbiter based on the uplink grant, wherein the first predicted priority is preconfigured; and
wherein the front-end arbiter is configured to:
arbitrate a transmission service of the first SIM card based on the PUSCH transmission information and the transmission service priority of the first SIM card.

7. The terminal device of claim 6, wherein the physical layer scheduler is further configured to:
receive a first priority of a to-be-transmitted packet that is configured by a Media Access Control (MAC) layer; and
update the transmission service priority of the first SIM card in the front-end arbiter to the first priority, wherein the to-be-transmitted packet is obtained through a transmission packeting operation based on the uplink grant after the MAC layer receives the uplink grant reported by the physical layer scheduler.

8. The terminal device according to claim 7, wherein the front-end arbiter is configured to:
determine an arbitration time point based on a start time of a PUSCH transmission and a preset arbitration advance, wherein the PUSCH transmission information comprises the start time of the PUSCH transmission;
trigger an arbitration procedure at the arbitration time point, and determine, based on the PUSCH transmission information, whether transmission of the first SIM card conflicts with transmission of a second SIM card of the plurality of SIM cards of the terminal device; and
when a conflict occurs, obtain an arbitration result by comparing the transmission service priority of the first SIM card with a transmission service priority of the second SIM card, wherein:
when the transmission packeting operation is completed before the arbitration time point, the transmission service priority of the first SIM card is the first priority; or
when the transmission packeting operation is completed after the arbitration time point, the transmission service priority of the first SIM card is the first predicted priority.

9. The terminal device according to claim 6, wherein the physical layer scheduler is further configured to:
receive a second predicted priority configured by a medium access control (MAC) layer, wherein the second predicted priority is generated by the MAC layer based on the remaining to-be-transmitted data of the first SIM card in a buffer, and the second predicted priority is configured as the transmission service priority of the first SIM card after a next uplink grant is received.

10. The terminal device according to claim 6, wherein the physical layer scheduler is further configured to:
collect statistics about an arbitration success rate of the first SIM card; and
when the arbitration success rate of the first SIM card is less than a preset threshold and the first SIM card is performing a target service, trigger fallback to a dual-SIM dual-standby 2.0 mode.

11. A non-transitory computer-readable storage medium, wherein the non-transitory computer-readable storage medium stores a computer program, and when the computer program is executed by a processor, a terminal device is configured to:
receive an uplink grant for a first subscriber identification module (SIM) card from a network device, wherein the first SIM card is comprised in a plurality of SIM cards of the terminal device;
configure a transmission service priority of the first SIM card as a first predicted priority, wherein the first predicted priority is preconfigured;
configure, based on the uplink grant, physical uplink shared channel (PUSCH) transmission information of the first SIM card; and
arbitrate a transmission service of the first SIM card based on the PUSCH transmission information and the transmission service priority of the first SIM card.

12. The computer-readable storage medium according to claim 11, wherein when the computer program is executed by the processor, the terminal device is further configured to:
determine a first priority of a to-be-transmitted packet, wherein the to-be-transmitted packet is obtained through a transmission packeting operation based on the uplink grant; and
update the transmission service priority of the first SIM card to the first priority.

13. The computer-readable storage medium according to claim 12, wherein arbitrating the transmission service of the first SIM card based on the PUSCH transmission information and the transmission service priority of the first SIM card comprises:
determining an arbitration time point based on a start time of a PUSCH transmission and a preset arbitration advance, wherein the PUSCH transmission information comprises the start time of the PUSCH transmission;
triggering an arbitration procedure at the arbitration time point, and determining, based on the PUSCH transmission information, whether transmission of the first SIM card conflicts with transmission of a second SIM card of the plurality of SIM cards of the terminal device; and
when a conflict occurs, obtain an arbitration result by comparing the transmission service priority of the first SIM card with a transmission service priority of the second SIM card, wherein:

when the transmission packeting operation is completed before the arbitration time point, the transmission service priority of the first SIM card is the first priority; or when the transmission packeting operation is completed after the arbitration time point, the transmission service priority of the first SIM card is the first predicted priority.

14. The computer-readable storage medium according to claim 12, wherein when the computer program is executed by the processor, the terminal device is further configured to:

after performing transmission packeting operation based on the uplink grant to obtain the to-be-transmitted packet, generate a second predicted priority based on remaining to-be-transmitted data of the first SIM card in a buffer, wherein the second predicted priority is configured as the transmission service priority of the first SIM card after a next uplink grant is received.

15. The computer-readable storage medium according to claim 11, wherein when the computer program is executed by the processor, the terminal device is further configured to:

collect statistics about an arbitration success rate of the first SIM card; and when the arbitration success rate of the first SIM card is less than a preset threshold and the first SIM card is performing a target service, trigger fallback to a dual-SIM dual-standby 2.0 mode.

* * * * *